US012807084B2

(12) United States Patent
Frederickson et al.

(10) Patent No.: US 12,807,084 B2
(45) Date of Patent: Nov. 24, 2026

(54) VEHICLE ACCESSORY PORT

(71) Applicant: Rivian IP Holdings, LLC, Plymouth, MI (US)

(72) Inventors: Austin Lee Frederickson, Carlsbad, CA (US); Christian V. Elder, Irvine, CA (US); Joshua Bayer, Costa Mesa, CA (US); Kyle Lobo, Westchester, CA (US); Alex Cheng-Chi Yang, Redwood City, CA (US); Paula Michelle Lobaccaro, San Clemente, CA (US); Daniel Geoffrey Walker, Laguna Niguel, CA (US); Rachel Esther Gitajn, San Clemente, CA (US); Amil Jayesh Vira, East Brunswick, NJ (US); Zechariah John Rudnicki, Holt, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 436 days.

(21) Appl. No.: 18/186,107

(22) Filed: Mar. 17, 2023

(65) Prior Publication Data

US 2024/0217461 A1 Jul. 4, 2024

Related U.S. Application Data

(60) Provisional application No. 63/435,918, filed on Dec. 29, 2022, provisional application No. 63/435,934, filed on Dec. 29, 2022.

(51) Int. Cl.
*B60R 16/03* (2006.01)
*H01R 33/945* (2006.01)
(Continued)

(52) U.S. Cl.
CPC ........... *B60R 16/03* (2013.01); *H01R 33/945* (2013.01); *H01R 33/965* (2013.01); *H01R 43/26* (2013.01); *H01R 2201/26* (2013.01)

(58) Field of Classification Search
CPC .... B60R 16/03; H01R 33/945; H01R 33/965; H01R 43/26; H01R 2201/26;
(Continued)

(56) References Cited

U.S. PATENT DOCUMENTS 4,667,154 A * 5/1987 Allerton ............. G01R 31/2886 324/755.05
5,344,330 A * 9/1994 Hoffman ................. B60L 53/16 439/138
(Continued)

FOREIGN PATENT DOCUMENTS

CN 113348109 A 9/2021
CN 113799884 A 12/2021
DE 202022102417 U1 * 7/2022 ............. B60R 16/03

OTHER PUBLICATIONS

Final Office Action mailed Nov. 23, 2022, for U.S. Appl. No. 17/827,306, filed May 27, 2022, eighteen pages.
(Continued)

*Primary Examiner* — Michael C Zarroli
(74) *Attorney, Agent, or Firm* — HG Law LLP

(57) ABSTRACT

An accessory port includes a contact positioned on a vehicle surface configured to electrically couple with an accessory to transfer power and/or data with the accessory.

20 Claims, 19 Drawing Sheets

(51) Int. Cl.
*H01R 33/965* (2006.01)
*H01R 43/26* (2006.01)

(58) Field of Classification Search
CPC .............. H01R 13/2421; H01R 13/447; H01R 13/5213; H01R 2103/00; H01R 2201/20
See application file for complete search history.

(56) References Cited

U.S. PATENT DOCUMENTS

| | | | | |
|---|---|---|---|---|
| 7,175,481 | B1 * | 2/2007 | Cotton | B60K 15/03 439/733.1 |
| 8,239,087 | B2 | 8/2012 | Dybalski et al. | |
| 9,738,125 | B1 | 8/2017 | Brickley et al. | |
| 10,266,131 | B2 * | 4/2019 | Eling | G06F 21/85 |
| 11,104,238 | B2 * | 8/2021 | Nakanishi | B60L 53/16 |
| 2002/0140289 | A1 | 10/2002 | Mcconnell et al. | |
| 2005/0203684 | A1 | 9/2005 | Borgesson | |
| 2006/0156415 | A1 | 7/2006 | Rubinstein et al. | |
| 2009/0191922 | A1 | 7/2009 | Rokusek et al. | |
| 2010/0075604 | A1 * | 3/2010 | Lydon | G06F 21/34 726/4 |
| 2013/0232350 | A1 | 9/2013 | Belesiu et al. | |
| 2014/0073254 | A1 | 3/2014 | Ichihara et al. | |
| 2015/0191093 | A1 * | 7/2015 | Yamamaru | B60L 53/16 320/109 |
| 2015/0331463 | A1 | 11/2015 | Obie et al. | |
| 2018/0018664 | A1 | 1/2018 | Purves et al. | |
| 2018/0039917 | A1 | 2/2018 | Buttolo et al. | |
| 2018/0361930 | A1 | 12/2018 | Levi | |
| 2019/0180630 | A1 | 6/2019 | Kleinbeck | |
| 2020/0064444 | A1 | 2/2020 | Regani et al. | |
| 2020/0106585 | A1 | 4/2020 | Bayer et al. | |
| 2020/0148280 | A1 | 5/2020 | Elder et al. | |
| 2020/0148281 | A1 | 5/2020 | Elder et al. | |
| 2020/0151943 | A1 | 5/2020 | Navarrette et al. | |
| 2020/0198578 | A1 | 6/2020 | Schroll et al. | |
| 2020/0380896 | A1 | 12/2020 | Alex | |
| 2020/0406860 | A1 | 12/2020 | Mai et al. | |
| 2021/0219114 | A1 | 7/2021 | Otaka | |
| 2021/0347270 | A1 | 11/2021 | Cole et al. | |
| 2021/0392107 | A1 | 12/2021 | Kakumanu et al. | |
| 2021/0392234 | A1 | 12/2021 | Lowman et al. | |
| 2021/0392551 | A1 | 12/2021 | Rubenstein et al. | |
| 2022/0017018 | A1 | 1/2022 | Perkins | |
| 2022/0029964 | A1 | 1/2022 | Kakumanu et al. | |
| 2022/0055491 | A1 * | 2/2022 | Labell | B60L 53/30 |
| 2022/0242366 | A1 | 8/2022 | Nagata et al. | |
| 2022/0244769 | A1 | 8/2022 | Pan et al. | |
| 2022/0402436 | A1 * | 12/2022 | Pawlowski | B60R 7/043 |
| 2023/0191926 | A1 * | 6/2023 | Cretin | H01R 13/5213 439/589 |
| 2024/0208421 | A1 * | 6/2024 | Harmon | B60R 7/08 |

OTHER PUBLICATIONS

Non-Final Office Action mailed Aug. 18, 2022, for U.S. Appl. No. 17/827,306, filed May 27, 2022, fifteen pages.
Notice of Allowance mailed Feb. 7, 2023, for U.S. Appl. No. 17/827,306, filed May 27, 2022, eight pages.

* cited by examiner

VEHICLE ACCESSORY PORT

CROSS-REFERENCE TO RELATED APPLICATIONS

This application claims the benefit of priority under 35 U.S.C. § 119 to U.S. Provisional Application No. 63/435,918 filed Dec. 29, 2022, and U.S. Provisional Application No. 63/435,934 filed Dec. 29, 2022, the entire contents of which are hereby expressly incorporated by reference in their entireties.

INTRODUCTION

Various vehicle accessories may be attached to the exterior of vehicles to serve a variety of functions. Some vehicle accessories may be purely mechanical and may be attached to pre-existing connection points on a vehicle. However, other accessories may have an electrical component that may require modifications to the vehicle for the accessories to be able to receive electrical power.

BRIEF SUMMARY

Vehicles may be manufactured with connection points that may require little or no modification to the vehicle when attaching mechanical vehicle accessories. However, vehicles may not be manufactured to supply electrical power to powered vehicle accessories that attach to the exterior of the vehicle. As a result, vehicle accessories with electrical components may require modifications to the vehicle that may be labor-intensive and may not be reversed without significant time and money, if at all. The present disclosure introduces an accessory port that may allow quick installation and removal of accessories with an electrical component while also being able to supply electrical power to the accessories. The accessory port may include a mechanical component for physically coupling with the accessory as well as an electrical component for electrically coupling with the accessory to supply electrical power. The accessory port may include various features to protect the electrical component from corrosion as a result of having an electrical current flowing through it while being exposed to an external environment. With electrical power being transferred, the accessory port may also evaluate an accessory before supplying electrical power to ensure that unsafely designed accessories do not couple with and attempt to receive electrical power from the accessory port.

In various embodiments, an accessory port includes a contact positioned on a vehicle surface configured to electrically couple with an accessory to transfer power and/or data with the accessory.

In various embodiments, the accessory port further includes a cover that adjusts between a first configuration and a second configuration, wherein in the first configuration, the cover encloses the contact, and wherein in the second configuration, the cover exposes the contact.

In various embodiments, the accessory port further includes a cover that adjusts between a first configuration and a second configuration when the accessory port physically couples with the accessory.

In various embodiments, the accessory port further includes a cover that automatically adjusts from a first configuration to a second configuration upon detecting the accessory, and wherein the cover automatically adjusts from the second configuration to the first configuration upon detecting the accessory decoupling from the accessory port.

In various embodiments, the vehicle surface is an inclined surface, and wherein the accessory port further comprises a drain positioned below the contact.

In various embodiments, the contact comprises an electrically-conductive material that is corrosion or wear resistant.

In various embodiments, the accessory port further includes a connector on the vehicle surface configured to physically couple with the accessory.

In various embodiments, the accessory port further includes a processor configured to authenticate the accessory.

In various embodiments, the processor is further configured to control electrical power supplied to the accessory via the contact.

In various embodiments, the accessory port further includes a seal positioned between the accessory and the accessory port while the accessory is physically coupled to the accessory port.

In various embodiments, the contact is flush with the vehicle surface.

In various embodiments, the accessory port further includes a mechanical indicator configured to provide an indication when the accessory is physically coupled to the accessory port.

In various embodiments, an accessory includes a connector configured to physically couple with an accessory port on a vehicle surface, and a contact configured to electrically couple with the accessory port and transfer power and/or data with the accessory port.

In various embodiments, the contact is a first contact, and the accessory further includes a second contact configured to transfer power and/or data with a second accessory.

In various embodiments, the contact is a first contact configured to debride a surface of a second contact on the accessory port while the accessory is physically coupling to the accessory port.

In various embodiments, the contact is a first contact, and wherein the connector is configured to debride a surface of a second contact on the accessory port while the accessory is coupling to the accessory port.

In various embodiments, the accessory further includes a latch, wherein the contact is adjusted in a direction away from the vehicle surface when the latch is engaged while coupling the accessory port and the accessory.

In various embodiments, the accessory further includes a surface protrusion that extends transversely across an end of the accessory, wherein the surface protrusion is positioned between a first point on a wall that extends around the end of the accessory and a second point on the wall.

In various embodiments, a method includes electrically coupling a first contact of an accessory with a second contact of an accessory port to transfer power and/or data with the accessory, and physically coupling a first connector of the accessory with a second connector of the accessory port.

In various embodiments, the method further includes controlling operation of the accessory on a user interface that is connected to the accessory port.

An accessory port provided herein may be attached to a vehicle surface. The accessory port may include electrical contacts for supplying electrical power from a vehicle battery to an accessory that couples to the accessory port. Because the electrical contacts may be exposed to an external environment, the accessory port may include various features for protecting the electrical contacts from environmental wear to reduce wear and corrosion.

In protecting the electrical contacts from environmental wear, the accessory port may help maintain an efficient transfer of electrical power despite continual use and environmental exposure, thereby reducing battery usage. The reduced battery usage may in turn lead to a variety of benefits in reducing climate change, such as: (1) a reduction in greenhouse gas emissions as the batteries do not need to be charged as frequently, reducing the emissions from power plants that generate the electrical power for the battery; (2) a reduction in waste as the batteries may have a longer usable lifespan, reducing the waste generated from prematurely discarding the batteries.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DETAILED DESCRIPTION

The present disclosure introduces accessory ports that may allow various powered vehicle accessories to attach to the exterior of a vehicle and receive electrical power from the vehicle without requiring modifications to the vehicle. The accessory port may be positioned on an exterior surface of a vehicle and may include a mechanical component for physically coupling with an accessory to secure the accessory to the accessory port. The accessory port may also include an electrical component for electrically coupling with an accessory. The electrical component may be an electrical contact that electrically couples with a powered vehicle accessory to transfer electrical power and/or data with the accessory. The electrical contact of the accessory port may transfer power from a power supply on the vehicle to the accessory and also exchange data with the accessory. In some embodiments, data from the accessory may be used to evaluate the accessory before supplying electrical power to determine whether the accessory is authorized to couple with the accessory port and receive electrical power from the accessory port. This may help ensure that unsafely designed accessories do not couple with and attempt to receive electrical power from the accessory port. The data may also be used for communication during operation of the accessory.

Figure 1A:
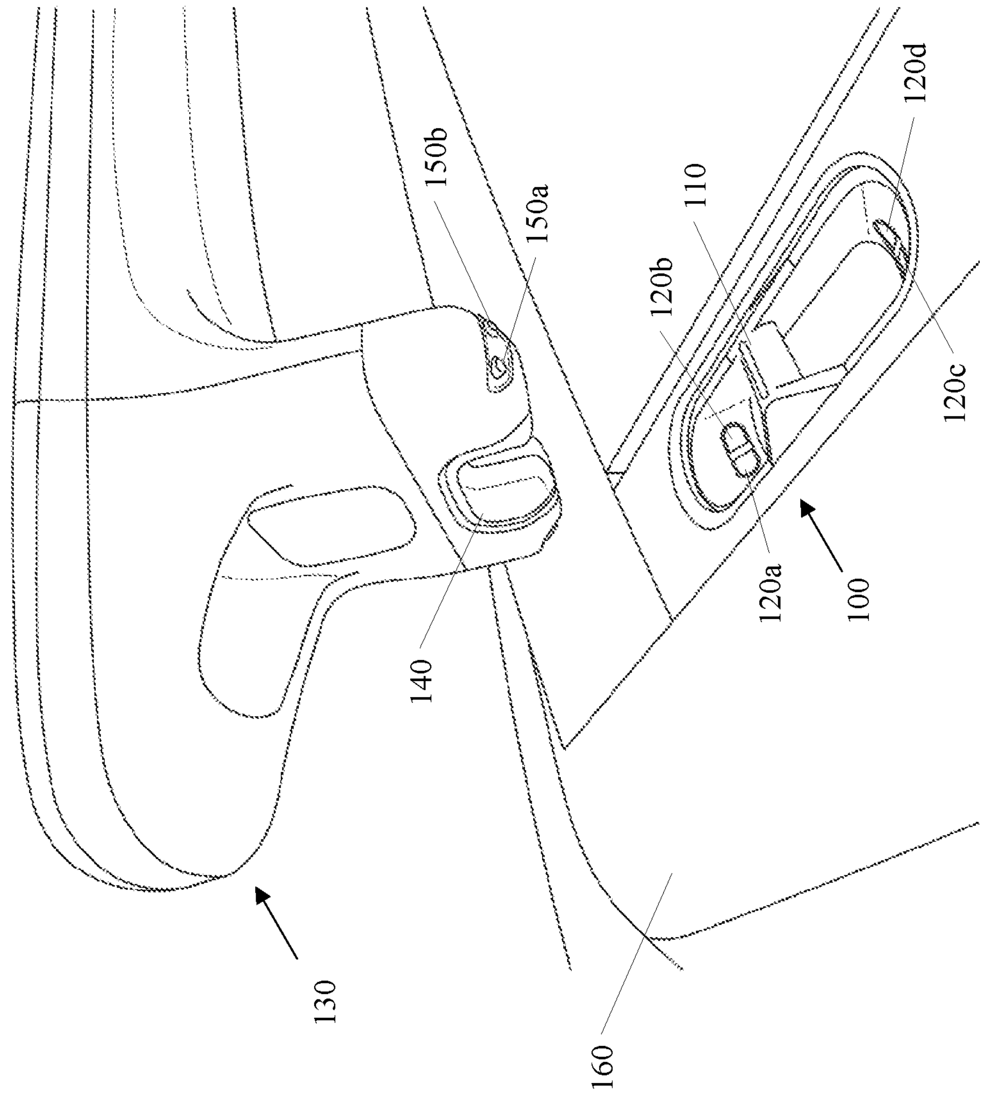
FIG. 1A illustrates a perspective view of an example accessory port for supplying electrical power to an electrically powered accessory.

FIG. 1A illustrates a perspective view of an example accessory port 100 for supplying electrical power to an electrically powered accessory 130. The accessory port 100 may be applied to the surface of a vehicle 160 so the vehicle 160 may supply electrical power to various vehicle accessories. While the accessory port 100 may be illustrated as being incorporated into the surface of the vehicle 160, in various embodiments, the accessory port 100 may be a separate component that is able to attach to and detach from the vehicle 160, as well as transfer electrical power and/or data with another accessory, such as accessory 130, that subsequently attaches to the accessory port 100. Additionally, the present disclosure may describe the accessory port 100 and its components as being positioned on a vehicle surface, but various embodiments may position the accessory port 100 and any of its components on any surface, such as the exterior surface of a home, mobile home, and/or trailer, among many others.

The accessory port 100 may include a connector 110 positioned on any surface, exterior surface, or vehicle surface, such as a vehicle roof, a vehicle truck bed, any side of the vehicle, or the hood of a vehicle, among many others. In various embodiments, the vehicle surface may be exposed to an external environment, which may be any environment that is exposed directly to the atmosphere, outdoor air, or ambient air. The accessory port 100 being exposed to the external environment may allow accessories that may be unable to connect to the interior of the vehicle 160 to still be able to connect to and transfer electrical power and/or data with the vehicle 160. The connector 110 may physically couple the accessory port 100 with an accessory 130 for the vehicle such that the accessory 130 is securely attached to the accessory port 100. The connector 110 may be illustrated as a striker bar, but various other connectors may also be appropriate, such as clamps, latches, inserts, locks, or some combination of various physical securing components. Thus, physically coupling the accessory port 100 with the accessory 130 may involve various operations that secures the accessory 130 to the accessory port 100, such as hooks on the accessory that securely wrap around the striker bar of the accessory port.

The accessory port 100 may also include electrical contacts **120*a*-120*d* positioned on the vehicle surface along with the physical connector 110. The electrical contacts 120*a*-120*d* may be configured to electrically couple the accessory port 100 with an accessory 130 to transfer electrical power and/or data with the accessory 130, where transferring data may include exchanging data with the accessory 130, as described further herein. The electrical power may be the electrical energy from an electrical current which may be used to power the accessory 130, and the data may be data about the accessory 130 that may be used to determine whether the accessory is authorized to couple with the accessory port 100 as part of authenticating the accessory 130, as described further herein. The data may also be data collected about the accessory 130 during operation, among many any other types of data. The electrical contacts 120*a*-120*d* may be a conductive component for establishing an electrical connection between the accessory port 100 and the accessory 130, and may take many forms, such as pins, wires, or plates constructed from electrically conductive material. The electrical contacts 120*a*-120*d* may complete an electrical circuit when they touch the corresponding electrical contacts of the accessory 130 which may allow an electrical current to flow from the accessory port 100 to the accessory 130 via the electrical contacts 120*a*-120*d*, transferring electrical power and/or data to the accessory 130. As referenced herein, transfer may be understood to include deliver/supply and/or receive, so transferring electrical power and/or data may include delivering electrical power, supplying electrical power, receiving electrical power, delivering data, supplying data, receiving data, or any combination thereof. Because the electrical contacts 120*a*-120*d* may be exposed to an external environment (e.g., positioned on the vehicle surface) while also having an electrical current flowing through them, the electrical contacts 120*a*-120*d* may gradually begin to corrode. Thus, to reduce the speed and extent to which the electrical contacts 120*a*-120*d* may corrode, the electrical contacts may be protected from exposure to the external environmental both when the accessory port 100 and accessory 130** are physically coupled as well as when they are physically decoupled.

The accessory 130 may also include various components for physically and electrically coupling to the accessory port 100 to securely attach to the accessory port and transfer electrical power and/or data with the vehicle 160 through the accessory port 100. For example, the accessory 130 may include a connector 140 for physically coupling with the accessory port 100. While the connector 140 may be any component capable of securely attaching the accessory 130 to the accessory port 100, various embodiments may consider that the connector 140 of the accessory 130 and the connector 110 of the accessory port 100 may need to correspond to one another in order for the accessory 130 and accessory port 100 to be physically coupled. If the connector 110 of the accessory port 100 is a striker bar, the connector 140 of the accessory 130 may need to be a component capable of coupling with a striker bar, such as a hook that grabs onto a striker bar. The accessory 130 may also include electrical contacts **150*a* and 150*b* for electrically coupling to the accessory port 100. When the electrical contacts 150*a* and 150*b* of the accessory 130 touch the electrical contacts 120*c* and 120*d* of the accessory port 100, with corresponding electrical contacts on the other side of the accessory 130 touching the electrical contacts 120*a* and 120*b*, the two sets of electrical contacts may complete a closed electrical circuit that allows an electrical current to pass through them. In this way, when the accessory 130 is coupled to the accessory port 100, the accessory 130 may transfer electrical power and/or data with the vehicle via the accessory port 100**.

Figure 1B:
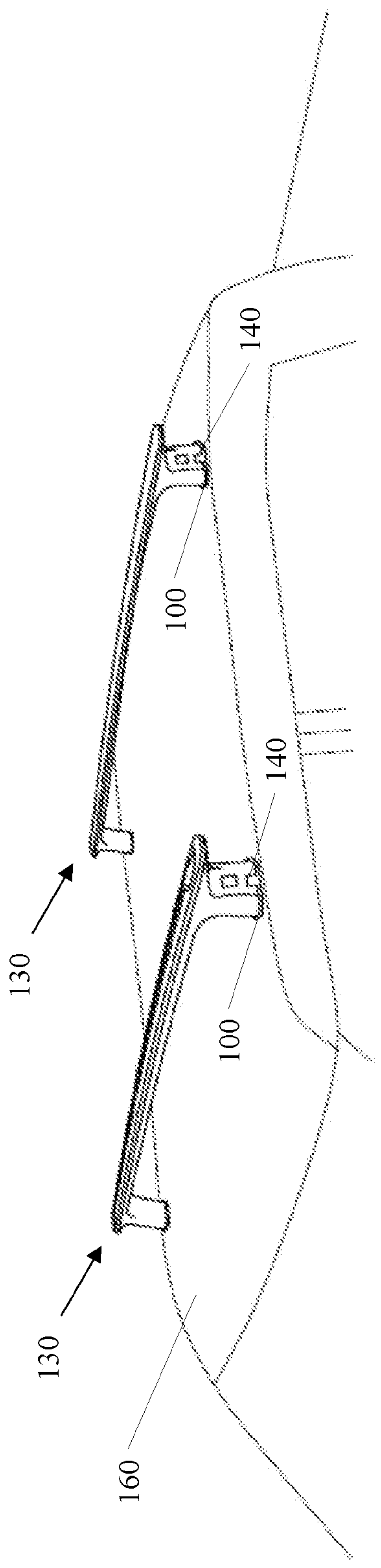
FIG. 1B illustrates a perspective view of an electrically powered accessory that is coupled to an accessory port of a vehicle.

FIG. 1B illustrates a perspective view of an electrically powered accessory 130 that is coupled to an accessory port 100 of a vehicle 160. The accessory 130 may be illustrated as a crossbar, but various other electrically powered accessories may also couple to the accessory port 100, such as electrically powered bikes (for charging), electrically powered camping gear (e.g., tents with built-in lights), canoes with an electric motor, lights, among many others. The accessory 130 may also be any component that acts as an intermediary for other accessories to transfer electrical power and/or data from the vehicle 160 to those other accessories. For example, the accessory 130 may be a cross bar that couples directly to the accessory port 100 on the vehicle 160, but also includes another accessory port of its own, which may be similar or different to the accessory port 100, that another accessory, such as a bike, may couple to. In this case, the accessory 130 may include a connector to physically couple with the accessory port 100 and a contact to electrically couple with the accessory port 100, where the contact for electrically coupling to the accessory port may be a first contact, and the accessory 130 may include a second contact to electrically couple with a second accessory to transfer electrical power and/or data with that second accessory. Such embodiments may be applicable where an electrically powered accessory is not able to couple with the accessory port 100 on the vehicle 160, but is able to couple with an accessory 130 which may in turn be coupled with the accessory port 100 of the vehicle 160. This way, accessories that may be unable to couple directly to the accessory port of the vehicle 160 may still transfer electrical power and/or data with the vehicle 160.

Figure 1C:
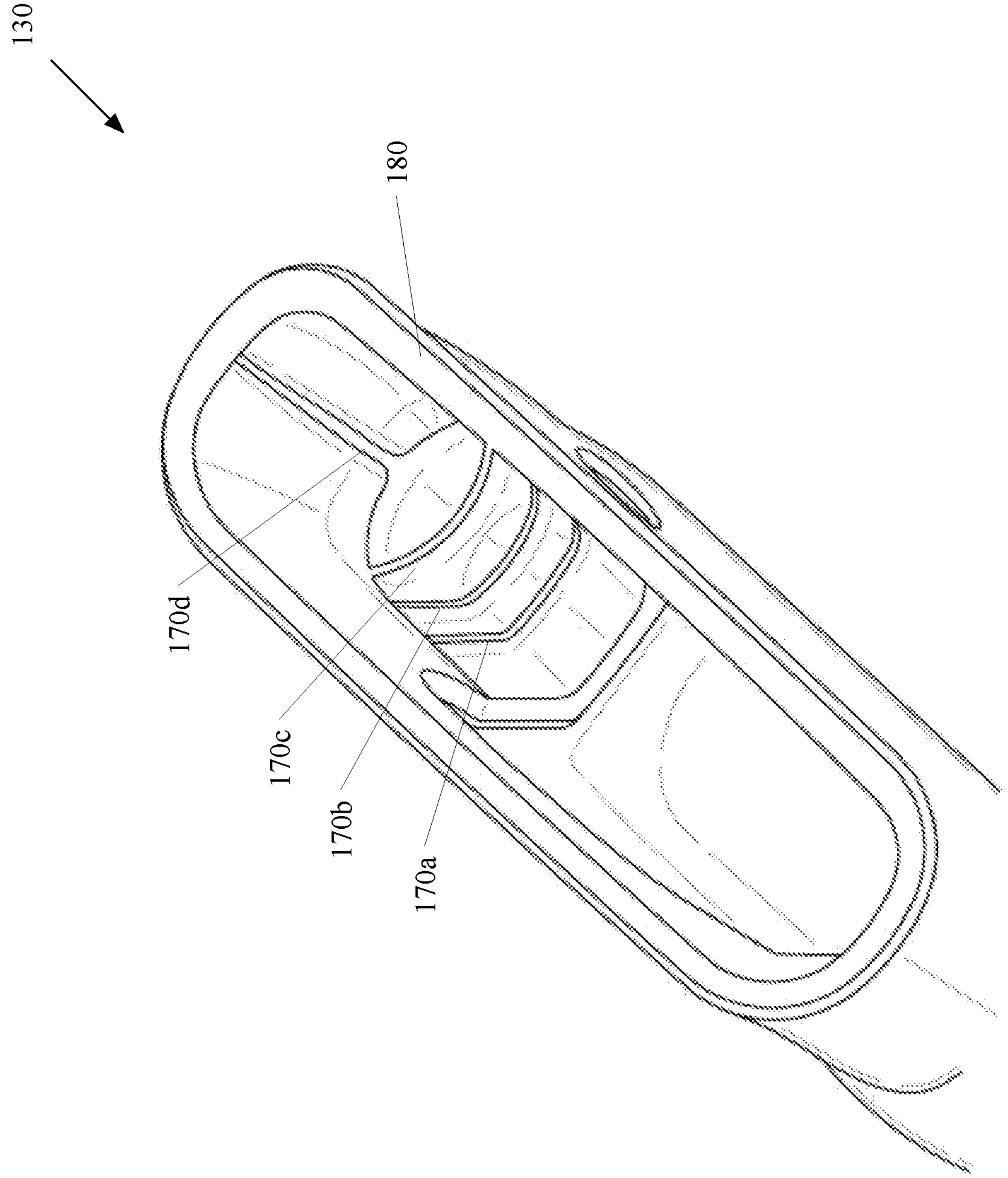
FIG. 1C illustrates a perspective bottom view of the end of the accessory that may couple with the accessory port on the vehicle surface.

FIG. 1C illustrates a perspective bottom view of the end of the accessory 130 that may couple with the accessory port 100 on the vehicle surface. The end of the accessory 130, which may also be referred to as the accessory boot, may include surface protrusions **170*a*-170*d* that extend transversely across the accessory boot and may be positioned between a first point on the wall 180 that extends around the accessory boot and a second point on the wall 180. The surface protrusions 170*a*-170*d* may address the challenge of coupling the accessory 130 to the accessory port 100 of different vehicles which may have slight structural differences due to manufacturing tolerances, where the accessory 130 may not even be able to couple with some accessory ports with high levels of yaw and/or roll. The surface protrusions 170***a*-170*d* may allow the accessory 130 to accommodate structural differences in the accessory port 100 without compromising the accessory's durability. In various embodiments, the surface protrusions 170*a*-170*d* may be positioned on the inside surface of the accessory boot, while electrical contacts, such as 150*a* and 150*b* of FIG. 1A, may be positioned along the outer surface of the accessory boot. This may allow the electrical contacts 150*a* and 150*b* to electrically couple the accessory 130 with the accessory port 100 while also allowing the surface protrusions 170*a*-170*d* to help physically couple the accessory with the accessory port.

Figure 2A:
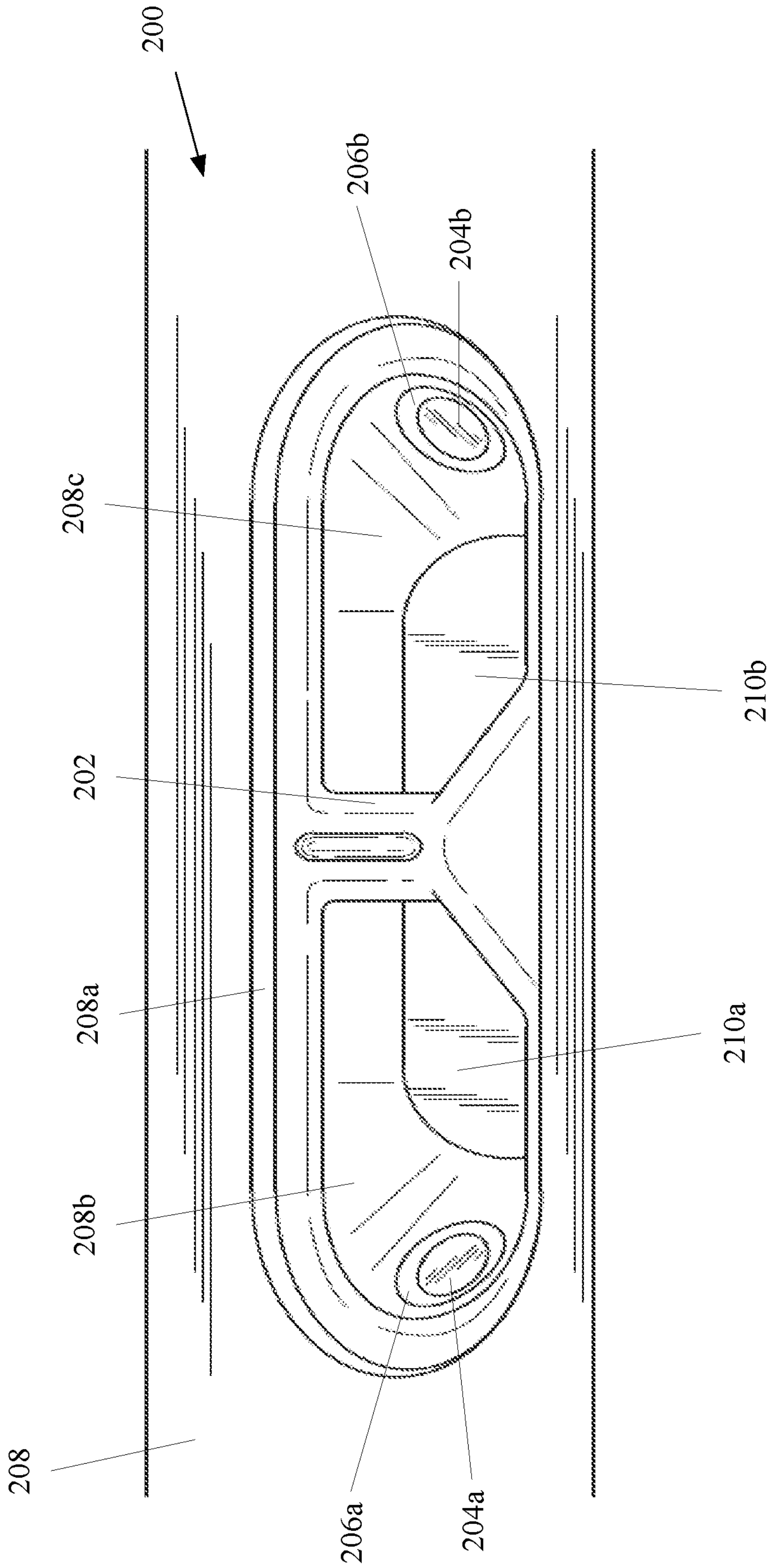
FIG. 2A illustrates a top view of an example accessory port.

FIG. 2A illustrates a top view of an example accessory port 200. The accessory port 200 may include a connector 202 to physically couple an accessory, such as the accessory 130 of FIG. 1A, with the accessory port 200. The connector 202 may be a striker bar, but as mentioned above, the connector may be any component capable of physically securing an accessory to the accessory port 200. The accessory port 200 may include electrical contacts 204*a* and 204*b*. The electrical contacts 204*a* and 204*b* may electrically couple the accessory port 200 with an accessory by completing an electrical circuit when brought into contact with a corresponding pair of electrical contacts on the accessory. The electrical circuit may then allow an electrical current to flow from the accessory port 200 to the accessory via the electrical contacts 204*a* and 204*b* of the accessory port 200.

One of the contacts 204*a* and 204*b* may be a voltage source, while the other contact may be a ground. In various embodiments, the ground may be a direct electrical or physical connection to the Earth. The voltage source may be any voltage level and the current that flows through the contacts 204*a* and 204*b* may be either direct current or alternating current. If alternating current is used, the contacts 204*a* and 204*b* together may be the voltage source, with the accessory port 200 acting as the ground. Alternatively, the accessory port 200 may include a third electrical contact, with two contacts as the voltage source for the alternating current and the third contact as the ground. As mentioned above, because the electrical contacts 204*a* and 204*b* may be exposed to an external environment while also having an electrical current flowing through them, the electrical contacts may gradually begin to corrode. Thus, the electrical contacts 204*a* and 204*b* may be constructed from electrically-conductive material that is corrosion or wear resistant and also has high surface hardness. This may be achieved by plating or cladding the contacts using metals such as gold, platinum, or palladium, but base metals with similar properties may also be appropriate, such as copper, aluminum, or nickel. Alternatively or additionally, any electrical current flowing through the electrical contacts 204*a* and 204*b* may be terminated upon an accessory decoupling from the accessory port 200. The absence of the electrical current may reduce the corrosion of the electrical contacts 204*a* and 204*b* despite the contacts remaining exposed to an external environment. The accessory port 200 may also include insulator sections 206*a* and 206*b* around the electrical contacts 204*a* and 204*b* to help hold the contacts in place while separating the contacts from any surrounding surface and/or structures to prevent the electrical current flowing through the electrical contacts from being transferred to the surroundings.

The accessory port 200 may be positioned on a vehicle surface 208 which, in various embodiments, may be completely level and flat. However, in various other embodiments, the vehicle surface 208 may not be completely level and flat in order to accommodate the accessory port 200. For example, a section of the vehicle surface 208*a* where the accessory port 200 is positioned may be at a lower level than the rest of the vehicle surface 208. The connector 202 of the accessory port 200 may then also be positioned on the lower level section 208*a*. Although the vehicle surface 208*a* may be illustrated as being on a lower level than the rest of the vehicle surface 208, in various other embodiments, the vehicle surface 208*a* where the accessory port 200 is positioned may be at a higher level than the rest of the vehicle surface 208. Positioning the vehicle surface 208*a* at a lower level than the rest of the vehicle surface 208 may provide damage protection for the electrical contacts 204*a* and 204*b*, while positioning the vehicle surface 208*a* at a higher level than the rest of the vehicle surface 208 may allow better drainage for the electrical contacts 204*a* and 204*b*, with drainage capability described further below. The section of the vehicle surface 208*a* with the accessory port 200 may also include sections 208*b* and 208*c* that are inclined at an angle to the horizontal. That is, the sections 208*b* and 208*c* of the vehicle surface may be inclined surfaces. The electrical contacts 204*a* and 204*b* may then be positioned on the inclined sections 208*b* and 208*c* of the vehicle surface 208*a*. Doing so may help reduce the buildup of dirt, grime, water, and various other obstructive materials on the electrical contacts 204*a* and 204*b* as the buildup may run down the inclined surfaces 208*b* and 208*c* instead of remaining on the electrical contacts. The electrical contacts 204*a* and 204*b* may be flush with the inclined surfaces 208*b* and 208*c* to further reduce the buildup of obstructive material by reducing the amount that may seep into the crevices around the contacts. As referenced herein, the electrical contacts 204*a* and 204*b* being flush with the inclined surfaces 208*b* and 208*c* may mean the electrical contacts 204*a* and 204*b* are substantially aligned with the inclined surfaces 208*b* and 208*c* to form a continuous surface with the inclined surfaces 208*b* and 208*c* such that there are few, if any, openings or crevices between the electrical contacts and the inclined surfaces. That is, the electrical contacts 204*a* and 204*b* may directly abut and thus be immediately adjacent to the inclined surfaces 208*b* and 208*c* such that the electrical contacts and the inclined surfaces share a common boundary. The electrical contacts 204*a* and 204*b* being flush with the inclined surfaces 208*b* and 208*c* may also allow for easier cleaning of the accessory port 200. The accessory port 200 may include drains 210*a* and 210*b* positioned at the lower end of the inclined vehicle surfaces 208*b* and 208*c* and below the electrical contacts 204*a* and 204*b* for any obstructive materials to drain into, which may help prevent the materials from accumulating in the accessory port 200.

It may be noted that while the accessory port 200 is illustrated with one connector 202 and two electrical contacts 204*a* and 204*b*, various embodiments may include any number of connectors and any number of electrical contacts. The connector 202 and electrical contacts 204*a* and 204*b* may also be illustrated as being positioned at specific locations, but various embodiments may position the connector and electrical contacts at any other location. Consideration may be given to the location of the connector and electrical contacts such that accessories are still able to physically and electrically couple to the accessory port via the connector and electrical contacts. The electrical contacts 204*a* and 204*b* may also be any electrical connector, such as pogo pins or spring fingers, and the contacts 204*a* and 204*b* may be different from each other, such as one contact being a pogo pin and the other a spring finger. The connector 202 and electrical contacts 204*a* and 204*b* may also be implemented such that they may separately couple to an accessory instead of simultaneously coupling to an accessory. For example, the connector 202 may be a striker bar that physically couples to a hook on an accessory, while the electrical contacts 204*a* and 204*b* may be wired contacts that extend outward from the accessory port 200 and thus may not electrically couple to the accessory at the same time that the accessory physically couples to the accessory port 200. The contacts 204*a* and 204*b* may then separately couple to the accessory after the accessory has physically coupled to the accessory port 200. This approach may be implemented in various embodiments as a pin and socket interconnection with wired pins. The electrical contacts 204*a* and 204*b* may include the wired pin that extend outward from the accessory port, and an accessory may include the corresponding socket. After the accessory physically couples to the accessory port 200 via the connector 202, the wired pins of the accessory port 200 may then insert into the sockets that may be on the accessory. Alternatively, the electrical contacts 204*a* and 204*b* of the accessory port 200 may include the socket, while the accessory that couples to the accessory port 200 may include the wired pins that insert into the sockets.

Figure 2B:
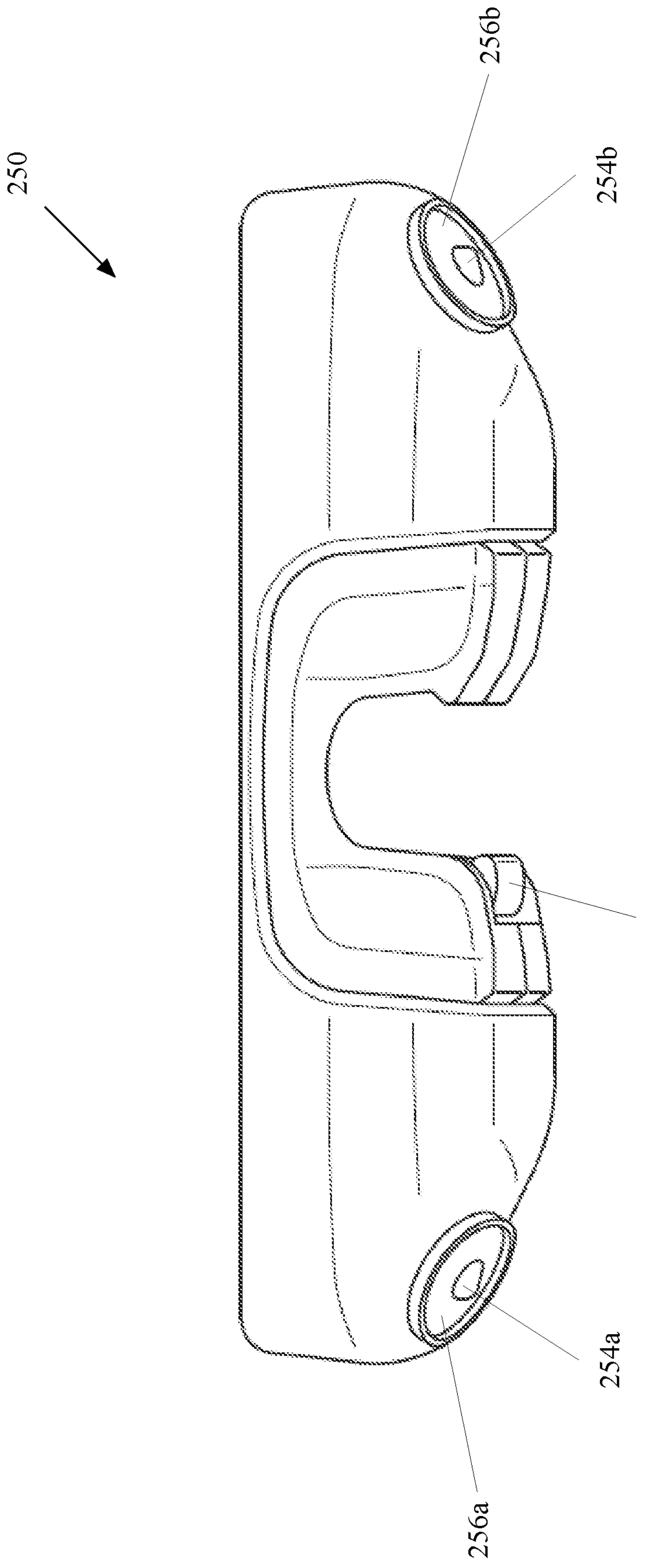
FIG. 2B illustrates a lower front view of an accessory that may couple to the accessory port on a vehicle.

FIG. 2B illustrates a lower front view of an accessory 250 that may couple to the accessory port 200 on a vehicle. The accessory 250 may include a connector 252 to couple the accessory to the accessory port 200 on a vehicle. Similar to the connector 202 of the accessory port 200, the connector 252 may be any component that physically secures the accessory 250 to the accessory port 200. The connector 252 may be a hook that grabs onto the striker bar that is illustrated as the connector 202 on the accessory port 200, but the connector 252 of the accessory 250 may also be other components if the connector 202 on the accessory port 200 is a different component, as the connectors may need to correspond with one another for the accessory 250 to couple to the accessory port 200.

The accessory 250 may include electrical contacts 254*a* and 254*b* that may couple with the electrical contacts 204*a* and 204*b* of the accessory port 200 such that electrical power and/or data may be transferred between the accessory port and the accessory 250. As mentioned above, when the electrical contacts 254*a* and 254*b* of the accessory 250 come into contact with the electrical contacts 204*a* and 204*b* of the accessory port, the electrical circuit that is formed as a result may allow an electrical current to flow from the accessory port to the accessory. Since the electrical contacts 254*a* and 254*b* of the accessory 250 may also be exposed to the external environment, particularly when not coupled to the accessory port, while having an electrical current flow through them, the electrical contacts 254*a* and 254*b* may also gradually corrode, similar to the electrical contacts 204*a* and 204*b* described above. As such, the electrical contacts 254*a* and 254*b* may also be constructed from electrically-conductive material that is corrosion or wear resistant and also has high surface hardness, which may be achieved by plating or cladding the contacts using metals such as gold, platinum, or palladium. Alternatively or additionally, any electrical current flowing through the electrical contacts 254*a* and 254*b* may be terminated upon the accessory 250 decoupling from the accessory port. The absence of the electrical current may reduce the corrosion of the electrical contacts 254*a* and 254*b* despite remaining exposed to the external environment.

In various embodiments, the electrical contacts 254*a* and 254*b* may be oriented at an angle to the vertical such that the electrical contacts 254*a* and 254*b* provide a "wiping" action that cleans the contacts of both the accessory port and the accessory when the accessory is coupled to the accessory port. If the electrical contacts 204*a* and 204*b* of the accessory port 200 are positioned on an inclined surface as shown in FIG. 2A and described above, the electrical contacts 254*a* and 254*b* of the accessory may initially touch off on a higher portion of the accessory port electrical contacts 204*a* and 204*b* before sliding across the surface of the accessory port contacts 204*a* and 204*b* as the accessory 250 is completely coupled to the accessory port. The accessory contacts 254*a* and 254*b* sliding across the accessory port contacts 204*a* and 204*b* may then debride and clean both sets of contacts to remove dirt or grime that may have built up on either set of contacts.

Similar to the electrical contacts 204*a* and 204*b* of the accessory port 200, the electrical contacts 254*a* and 254*b* of the accessory 250 may also be implemented as various different electrical connectors, but certain implementations may provide certain advantages. For example, if the electrical contacts 254*a* and 254*b* are implemented as pogo pins, the ability of pogo pins to remain in contact with corresponding contacts may help the accessory port 200 and accessory 250 accommodate greater placement variation and manufacturing tolerance along the X, Y, and Z-axes. It may be the case that coupling the accessory 250 to the accessory port 200 is a very manual process and, depending on additional factors such as the location, a blind operation. Additionally, there may be large tolerances in the manufacturing of the accessory port 200, the accessory 250, or even the vehicle itself. Using pogo pins for the electrical contacts 254*a* and 254*b* may allow the connection between the accessory port 200 and accessory 250 to accommodate that variation in placement and tolerance in manufacturing, and may be enhanced if the accessory port contacts 204*a* and 204*b* are implemented as flat contacts.

The accessory 250 may include seals 256*a* and 256*b* positioned around the electrical contacts 254*a* and 254*b*. The seals 256*a* and 256*b* may extend slightly outwards from the surface of the accessory 250 to surround the electrical contacts 254*a* and 254*b*, which may reduce some of the contact's exposure to the external environment when the accessory 250 is decoupled to the accessory port 200. The seals 256*a* and 256*b* may also reduce the external environment exposure of the contacts for both the accessory and the accessory port when the accessory port 200 and accessory 250 are coupled. When the accessory 250 is coupled to the accessory port 200, the seals 256*a* and 256*b* may be positioned between the accessory 250 and the accessory port 200 to fill any space that may remain between the accessory and accessory port. With the space filled, exposure to the external environment may be reduced while also reducing the debris that is able to buildup on either the accessory contacts 254*a* and 254*b* or the accessory port contacts 204*a* and 204*b*.

In some embodiments, the seals 256*a* and 256*b* are part of the accessory 250, but in various other embodiments, the seals may be part of the accessory port 200 and still perform a similar function. Alternatively, both the accessory port 200 and the accessory 250 may both include seals that mutually come into contact when the accessory is coupled to the accessory port. The seals 256*a* and 256*b* may also be any seal that is able to fill the space between mating surfaces, such as a gasket. Additionally, the seals 256*a* and 256*b* may be static components of the accessory 250 and/or accessory port 200, but the seals may also be dynamic components that are stored within the accessory 250 or accessory port 200 when not coupled, but is able to detect when the accessory and accessory port approach one another and automatically deploys upon making that detection.

Figure 3:
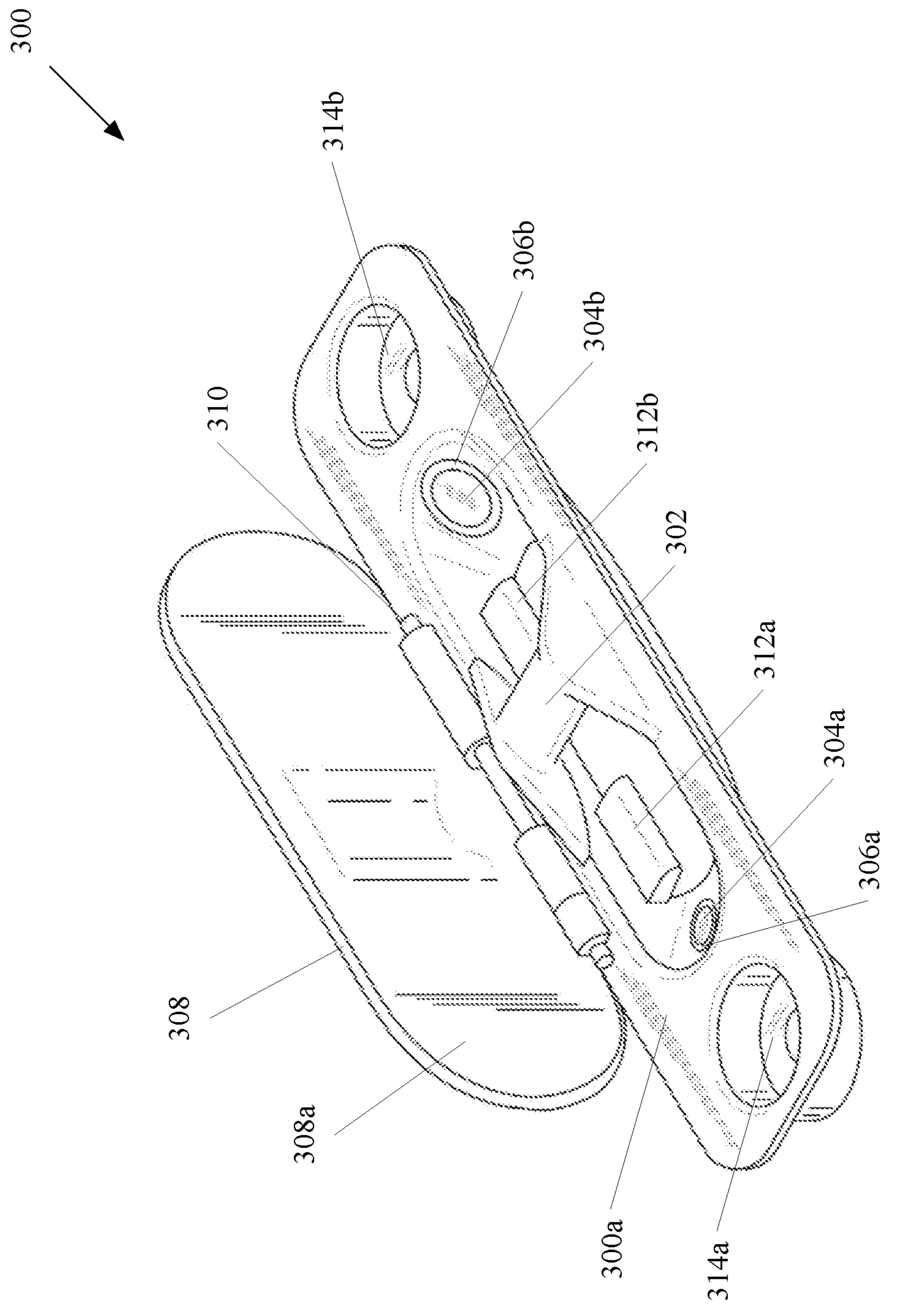
FIG. 3 illustrates a perspective view of another example accessory port.

FIG. 3 illustrates a perspective view of another example accessory port 300. The accessory port 300 may include a connector 302 to physically couple an accessory, such as the accessory 130 of FIG. 1A or the accessory 250 of FIG. 2B, to the accessory port 300. The connector 302 may be a striker bar, but as mentioned above, the connector may be any component capable of physically securing an accessory to the accessory port 300. The accessory port 300 may include electrical contacts 304*a* and 304*b* which electrically couple the accessory port 300 to an accessory. The accessory port 300 may also include insulator sections 306*a* and 306*b* around the electrical contacts 304*a* and 304*b* to hold the contacts in place while insulating the contacts from the surrounding surface. In various embodiments, the connector 302 may correspond to the connector 202 of FIG. 2A, the electrical contacts 304*a* and 304*b* may correspond to the electrical contacts 204*a* and 204*b* of FIG. 2A, and the insulator sections 306*a* and 306*b* may correspond to the insulator sections 206*a* and 206*b* of FIG. 2A.

As mentioned above, the electrical contacts 304*a* and 304*b* may gradually corrode as a result of exposure to an external environment while having an electrical current flowing through them. As such, the accessory port 300 may include a cover 308 to protect the electrical contacts 304*a* and 304*b* from exposure to an external environment when the accessory port 300 is not coupled to an accessory. The cover 308 may protect the electrical contacts 304*a* and 304*b* by enclosing the electrical contacts 304*a* and 304*b* to reduce the amount of dirt and grime that may get onto and build up on the electrical contacts. FIG. 3 illustrates the cover 308 in an open configuration where the cover 308 exposes the electrical contacts 304*a* and 304*b*. The open configuration may also be a first configuration for the cover 308. The cover 308 in the open configuration may allow the electrical contacts 304*a* and 304*b* to electrically couple with corresponding electrical contacts of an accessory when the accessory is coupled to the accessory port 300. The cover 308 may be able to adjust to a closed configuration when the accessory port 300 is physically decoupled with an accessory. The closed configuration may also be a second configuration for the cover 308. In the closed configuration, the cover 308 may enclose the electrical contacts 304*a* and 304*b* by being positioned over the electrical contacts and shield them from environmental exposure. The inner surface 308*a* of the cover 308 may be pressed against the surface 300*a* of the accessory port 300 to prevent dirt and grime from getting inside the accessory port and onto the electrical contacts 304*a* and 304*b*. The cover 308 may also be water-resistant and air-tight so the cover 308 in the closed configuration may further prevent dirt and grime from getting inside the accessory port 300. To that end, the cover 308 may also be pressure sealed when enclosing the electrical contacts 304*a* and 304*b* in the closed configuration. The accessory port may include a hinge 310 to rotate the cover 308 and adjust the cover 308 between the open and closed configurations. The hinge 310 may be illustrated with an exposed axle, but various other hinge types may also be appropriate, such as spring hinges, continuous hinges, butt hinges, piano hinges, or concealed hinges. Additionally, although cover 308 is described as adjustable between an open and closed configuration, the cover 308 may also be adjusted to any continuous configuration that is between the open and closed configurations, such as a configuration that is halfway between the open and closed configurations.

The accessory port 300 is illustrated with the hinge 310 positioned above the accessory port surface 300*a*, but in various embodiments, the hinge 310 may also be positioned below the surface 300*a*, and thus may be positioned below the vehicle surface which may be connected to the accessory port surface 300*a*, such as the vehicle surface 208 of FIG. 2A. In such embodiments, when the hinge 310 rotates the cover 308 from the closed configuration enclosing the electrical contacts 304*a* and 304*b* to the open configuration exposing the electrical contacts, the cover 308 in the open configuration may be positioned in an opening that is at a lower level than the accessory port surface 300*a* such that the cover 308 may not be visible from an external perspective. In other words, the opening may be similar to an alcove between the accessory port surface 300*a* and the vehicle surface, with the cover 308 positioned in that alcove in the open configuration and thus not visible from an external perspective. Additionally, the cover 308 may also be a removeable cover that is able to be detached from the accessory port 300 in the open configuration and subsequently reattached to the accessory port 300 in the closed configuration. The cover 308 may also be a sliding cover that slides between the open and closed configurations, instead of rotating via the hinge 310.

In various embodiments, the cover 308 may be manually adjusted between the open and closed configurations by a user. For example, the cover 308 may be directly lifted by a user when in the closed configuration to be adjusted to the open configuration and subsequently pushed downwards when in the open configuration to be adjusted to the closed configuration. The accessory port 300 may also include a mechanical component, such as a button or switch, that may be triggered to cause the cover 308 to adjust between the open and closed configurations. The mechanical component may be automatically triggered by an accessory when the accessory couples and decouples with the accessory port 300, but the mechanical component may also be manually triggered by a user in the process of coupling and decoupling an accessory with the accessory port 300. For example, the mechanical component may be a mechanical indicator that is configured to provide an indication when the accessory is physically coupled or is physically coupling to the accessory port 300.

The mechanical components 312*a* and 312*b* of the accessory port 300 may be exemplary embodiments of the mechanical components that may be triggered by an accessory coupling with the accessory port 300, as described above. The mechanical components 312*a* and 312*b* may be triggered when an accessory is coupled with the accessory port 300, which may in turn cause the cover 308 to adjust to the open configuration. When the accessory subsequently decouples with the accessory port 300, the mechanical components 312*a* and 312*b* may be triggered again to adjust the cover 308 to the closed configuration. Alternatively, the mechanical components 312*a* and 312*b* may remain triggered while an accessory is coupled with the accessory port 300, causing the cover 308 to adjust to and remain in the open configuration. When the accessory subsequently decouples with the accessory port 300, the mechanical components 312*a* and 312*b* may stop being triggered, which may cause the cover 308 to adjust to the closed configuration.

In various embodiments, the mechanical components 312*a* and 312*b* may also serve the function of securing the cover 308 to the accessory port 300. The mechanical components 312*a* and 312*b* may grab onto the accessory port 300 to prevent the cover 308 from moving out of position.

While the mechanical components 312*a* and 312*b* in various embodiments may prevent the cover 308 from being pulled away from the accessory port 300, in various other embodiments where the cover 308 may be a removeable cover, the mechanical components 312*a* and 312*b* may be able to disengage to allow the cover 308 to be removed from the accessory port 300.

The accessory port 300 may also include various additional features that allow the cover 308 to be able to automatically adjust between the open and closed configurations based on whether an accessory is coupled, coupling, decoupled, or decoupling with the accessory port 300. For example, the accessory port 300 may include proximity sensors for detecting when the accessory is in the proximity of the accessory port 300 and electromechanically adjust the cover 308 to the open or closed configuration accordingly. Such sensors may transmit signals to the cover 308 when an accessory is detected that causes the cover to adjust to the open configuration and expose the electrical contacts 304*a* and 304*b*. While the accessory remains coupled to the accessory port 300, the sensors may continue to detect the accessory and consequently continue to transmit signals to the cover 308 for the cover 308 to remain in the open configuration. When the accessory subsequently decouples from the accessory port 300 and moves away from the accessory port, the sensors may no longer detect the accessory, and may transmit different signals to the cover 308 that cause the cover to adjust to the closed configuration where the cover 308 encloses the electrical contacts 304*a* and 304*b* to protect the contacts from exposure to the external environment since they are no longer in use. Alternatively, the cover 308 may be configured to remain in the closed configuration by default, and adjusts to the open configuration only upon receiving signals from the sensors. While the accessory is coupled to the accessory port 300, the cover 308 may continue to receive signals and thus remain in the open configuration. When the accessory decouples from the accessory port 300, the sensors may cease to transmit signals, and the cover 308 may consequently return to the closed configuration. In various embodiments, the cover 308 may directly receive and process signals to automatically adjust between the open and closed configurations, but in various other embodiments, a separate processor may receive and process signals before generating corresponding commands for the cover 308 on whether to adjust to the open or closed configurations. Proximity sensors are described herein, but many other sensors may be appropriate in various embodiments, such as ambient light sensors. Although an example method of the cover 308 being able to automatically adjust between the open and closed configuration is discussed, it should be noted that many other approaches may also be appropriate.

To optimize the protection that the cover 308 may provide for the electrical contacts 304*a* and 304*b*, the accessory port 300 may include features to detect when the cover 308 remains in the open configuration when an accessory is not coupled with the accessory port 300. Many approaches may be appropriate, such as the proximity sensors described above that may detect when an accessory is or is not within the proximity of the accessory port 300, or a mechanical button that may be activated when an accessory is coupled with the accessory port 300 but is deactivated when the accessory decouples with the accessory port. Upon detecting the cover 308 remaining in the open configuration when no accessory is coupled with the accessory port 300, the accessory port may transmit a notification to a user interface connected to the accessory port to notify a user that the cover 308 is still in the open configuration. The user interface may be any interface accessible to a user who may be associated with the vehicle for the accessory port 300, such as the infotainment system of the vehicle or a user's mobile device. An example user interface that may be connected with the accessory port 300 is described further below with respect to FIG. 9.

The accessory port 300 may also include preconfigured structures 314*a* and 314*b* that may aid in securing the accessory port 300 to a vehicle surface, such as the vehicle surface 208*a* of FIG. 2. The preconfigured structures 314*a* and 314*b* may be pre-molded areas where a fastener may be inserted to secure the accessory port 300 to a vehicle surface. For example, the preconfigured structures 314*a* and 314*b* may be screw bosses where screws may be inserted to secure the accessory port 300 to a vehicle surface.

Figure 4:
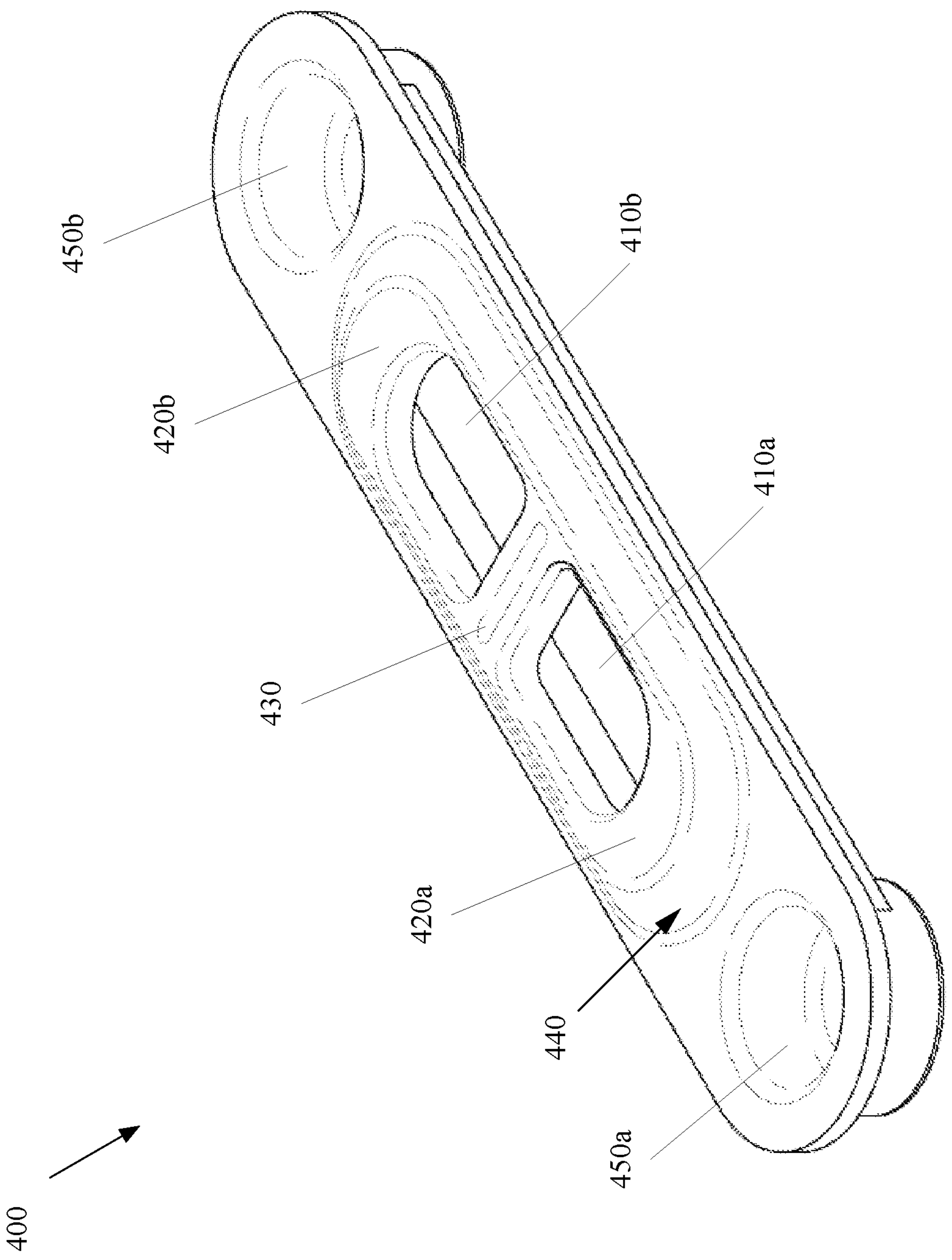
FIG. 4 illustrates a perspective top view of a third example accessory port.

FIG. 4 illustrates a perspective top view of a third example accessory port 400. The accessory port 400 may include an openings 410*a* and 410*b* where an accessory may be inserted into when physically coupling with the accessory port 400. As such, the openings 410*a* and 410*b* may operate as a connector, such as the connector 302 of the accessory port 300. An accessory may be inserted into the openings 410*a* and 410*b* before latching onto the sides or underside of the openings to be secured to the accessory port 400, with one example approach described further herein, although many other approaches may be appropriate. The accessory port 400 may include overhang sections 420*a* and 420*b* extending from the edges of the accessory port 400 and on either side of the openings 410*a* and 410*b*. The electrical contacts for the accessory port 400 may be positioned below the overhang sections 420*a* and 420*b* or on the underside of the overhang sections so that the overhang sections 420*a* and 420*b* may help protect the electrical contacts from exposure to an external environment when an accessory is not coupled with the accessory port 400. The electrical contacts may still be exposed despite being positioned below the overhang so the electrical contacts of an accessory may still electrically couple with them when the accessory is coupled to the accessory port 400. Although the accessory port 400 may be positioned on a vehicle surface such that the accessory port is at a lower level than the surrounding vehicle surface, similar to accessory port 200 of FIG. 2A, the accessory port 400 may also be positioned at a higher level from the surrounding vehicle surface such that the accessory port 400 extends outward from the vehicle surface.

The accessory port 400 may also include a center bar 430 that extends transversely across the accessory port 400 and positioned between the openings 410*a* and 410*b*. The center bar 430 in various embodiments may operate as a connector that an accessory may latch onto when physically coupling with the accessory port 400. In various other embodiments, the center bar 430 may be used for hooking or latching other objects to the accessory port 400 instead of or in addition to the primary accessory that may be coupled with the accessory port, such as secondary accessories or other equipment like ratchet straps, among many others. The accessory port 400 may include a raised section 440 that may be at a higher level than the rest of the accessory port 400. The raised section 440 may provide additional space for an accessory to electrically couple with the electrical contacts of the accessory port 400, which may be positioned below the overhang sections 420*a* and 420*b*. The raised section 440 may also serve to provide more space for any other vehicle components that may be positioned below the accessory port 400, such as airbags of a vehicle. Similar to the accessory port 300 of FIG. 3, the accessory port 400 may include preconfigured sections 450*a* and 450*b* where fasteners may be positioned to secure the accessory port 400 to a vehicle surface.

Figure 5:
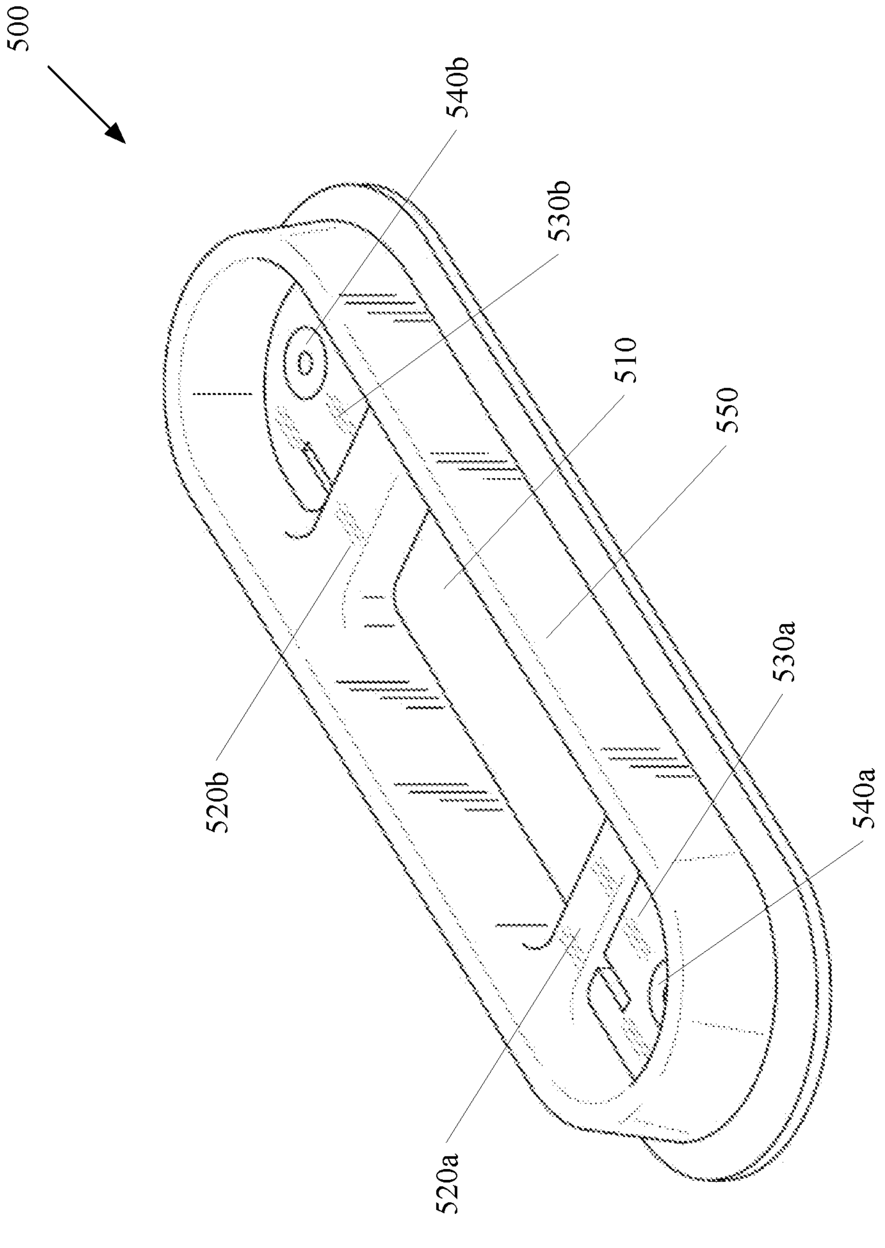
FIG. 5 illustrates a perspective bottom view of the third example accessory port.

FIG. 5 illustrates a perspective bottom view of a fourth example accessory port 500. The accessory port 500 may include an opening 510 where an accessory may be inserted into when physically coupling with the accessory port. The accessory port 500 may include striker bars 520*a* and 520*b* on either side of the opening 510 that a corresponding component of an accessory, such as a striker plate, latches, or hooks, may couple with to secure the accessory to the accessory port 500. That is, an accessory may be inserted through the opening 510 and then couple to the striker bars 520*a* and 520*b* on either side of the opening 510 to secure the accessory to the accessory port 500. The accessory port 500 may also include electrical contacts 530*a* and 530*b* positioned on the underside of the accessory port 500, such as on the underside of overhang sections 420*a* and 420*b* of FIG. 4. The electrical contacts 530*a* and 530*b* may electrically couple an accessory with the accessory port 500 when the electrical contacts 530*a* and 530*b* come into contact with the electrical contacts of an accessory. The electrical contacts 530*a* and 530*b* may be secured to the accessory port 500 via fasteners 540*a* and 540*b*, which may be screws or bolts, among many others. The electrical contacts 530*a* and 530*b* may be protected from exposure to an external environment by a wall 550 that may extend around the accessory port 500. The wall 550 may surround the electrical contacts 530*a* and 530*b* to reduce the amount of dirt and grime that is able to get onto and build up on the electrical contacts 530*a* and 530*b*.

Figure 6A:
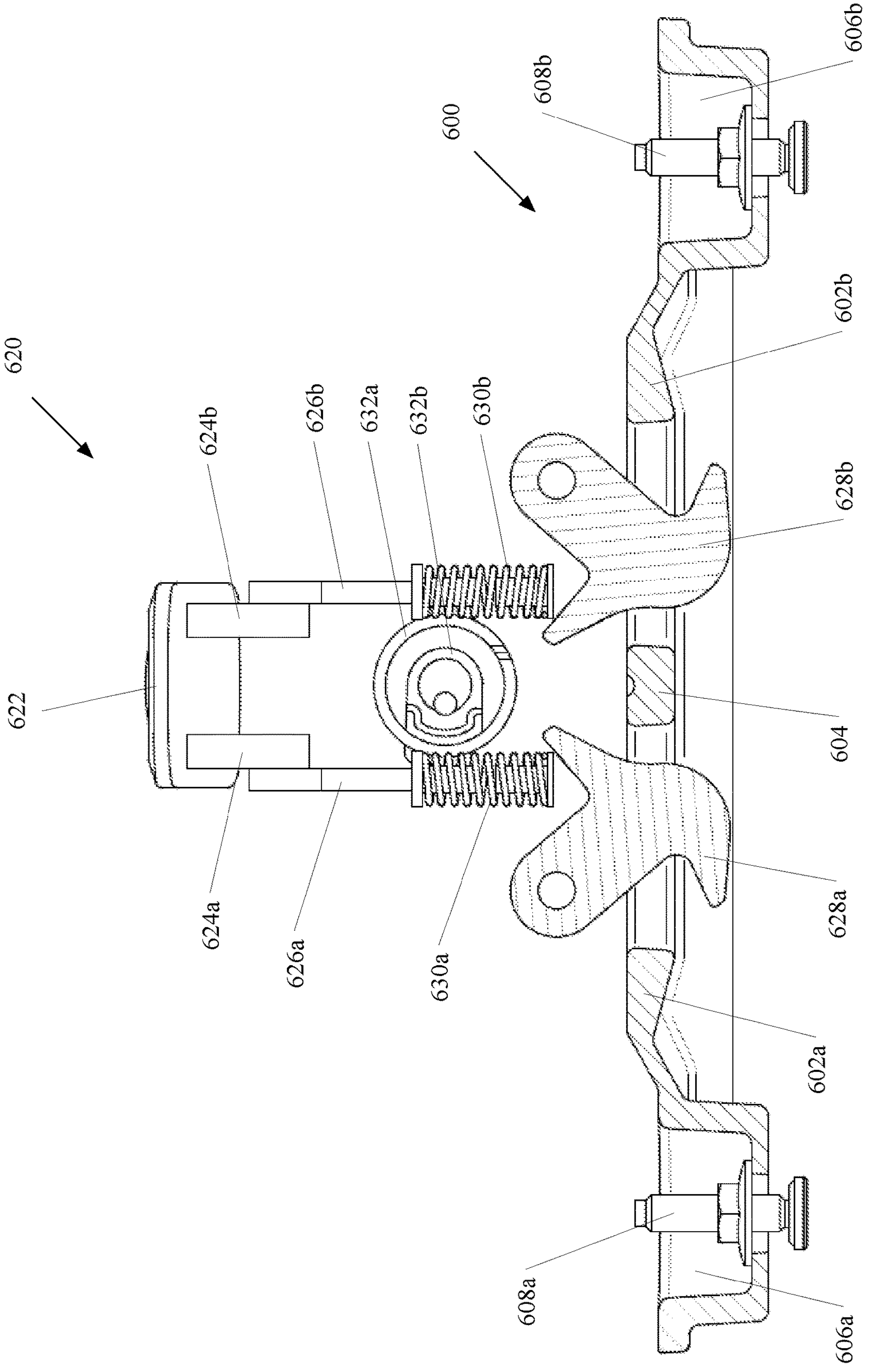
FIG. 6A illustrates a front cross-section view of an accessory coupled to an accessory port.

FIG. 6A illustrates a front cross-section view of an accessory 620 coupled to an accessory port 600. The accessory port 600 may include various features from the accessory ports 400 of FIG. 4 and 500 of FIG. 5, such as striker bars 602*a* and 602*b* that an accessory may physically couple with and a center bar 604 that may be used to attach additional objects. In various embodiments, the striker bars 602*a* and 602*b* may correspond to the striker bars 520*a* and 520*b* of FIG. 5, and the center bar 604 may correspond to the center bar 430 of FIG. 4. The striker bars 602*a* and 602*b* may be the connectors of the accessory port 600 that a corresponding connector of the accessory 620 (such as the hooks 628*a* and 628*b* described further below) physically couples with for the accessory 620 to be secured to the accessory port 600. The accessory port 600 may include electrical contacts positioned along the underside surfaces of the striker bars 602*a* and 602*b*, or on a surface that lays under the striker bars 602*a* and 602*b*. The accessory port 600 may also include preconfigured sections 606*a* and 606*b* where fasteners 608*a* and 608*b* may be positioned to secure the accessory port 600 to a vehicle surface. The preconfigured sections 606*a* and 606*b* may be screw bosses where the fasteners 608*a* and 608*b*, which may be screws, are positioned to secure the accessory port 600.

The accessory 620 may be any electrically powered accessory which may be equipped with a two hook structure for coupling with the accessory port 600. The two hook structure for the accessory 620 may include a lever 622 that is in an open position which, when pushed downwards, may become engaged and in turn also push a first set of spring loaded push bars 624*a* and 624*b* downwards. The first set of spring loaded push bars 624*a* and 624*b* being pushed downwards may in turn push a second set of spring loaded push bars 626*a* and 626*b* downwards. The second set of spring loaded push bars 626*a* and 626*b* may be in contact with hooks 628*a* and 628*b* at the bottom of the two hook structure. As the second set of spring loaded push bars 626*a* and 626*b* is pushed downwards, the spring loaded push bars may push the hooks 628*a* and 628*b* outwards and upwards from their positions as shown toward the striker bars 602*a* and 602*b* of the accessory port 600. In other words, the spring loaded push bars 626*a* and 626*b* being pushed downwards may push the hooks 628*a* and 628*b* to rotate towards the striker bars 602*a* and 602*b*. Additionally, because the hooks 628*a* and 628*b* may initially be positioned above the vehicle surface that the accessory port 600 is secured to, the hooks 628*a* and 628*b* being pushed upwards may mean the hooks are pushed in a direction away from the vehicle surface.

The two hook structure of the accessory 620 may also include springs 630*a* and 630*b* incorporated into the spring loaded push bars 626*a* and 626*b*. The springs 630*a* and 630*b* may begin to compress after the hooks 628*a* and 628*b* have been pushed outwards enough to make contact with the striker bars 602*a* and 602*b* of the accessory port 600. The springs 630*a* and 630*b* may continue to compress until the lever 622 has reached an over-center position, as described further below. The springs 630*a* and 630*b* may help the two hook structure self-adjust as needed to accommodate for build tolerance in the accessory 620, the accessory port 600, the vehicle, or any combination thereof, such that despite any build tolerance, the lever 622 may fully engage and the hooks 628*a* and 628*b* are able to securely attach to the striker bars 602*a* and 602*b*, allowing the accessory 620 to securely couple with the accessory port 600. The springs 630*a* and 630*b* may also allow the hooks 628*a* and 628*b* to return to the positions shown in FIG. 6A when the lever 622 is lifted and disengaged from the position shown in FIG. 6C and described further below.

The accessory 620 may also include a lock cylinder, which may include a retainer 632*a* and keyway 632*b*, positioned between the spring loaded push bars 626*a* and 626*b*. The lock cylinder may introduce an additional level of security that may help prevent the accessory 620 from unintentionally becoming decoupled with the accessory port 600. The accessory 620 may include a separate component that interacts with the spring loaded push bars 626*a* and 626*b* once the lever 622 has pushed the spring loaded push bars downwards to lock the push bars in place. This may allow the lever 622 to be lifted to expose the lock cylinder without also disengaging the two hook structure of the accessory 620. The lock cylinder may then be locked and unlocked by inserting a key into the keyway 632*b*.

Figure 6B:
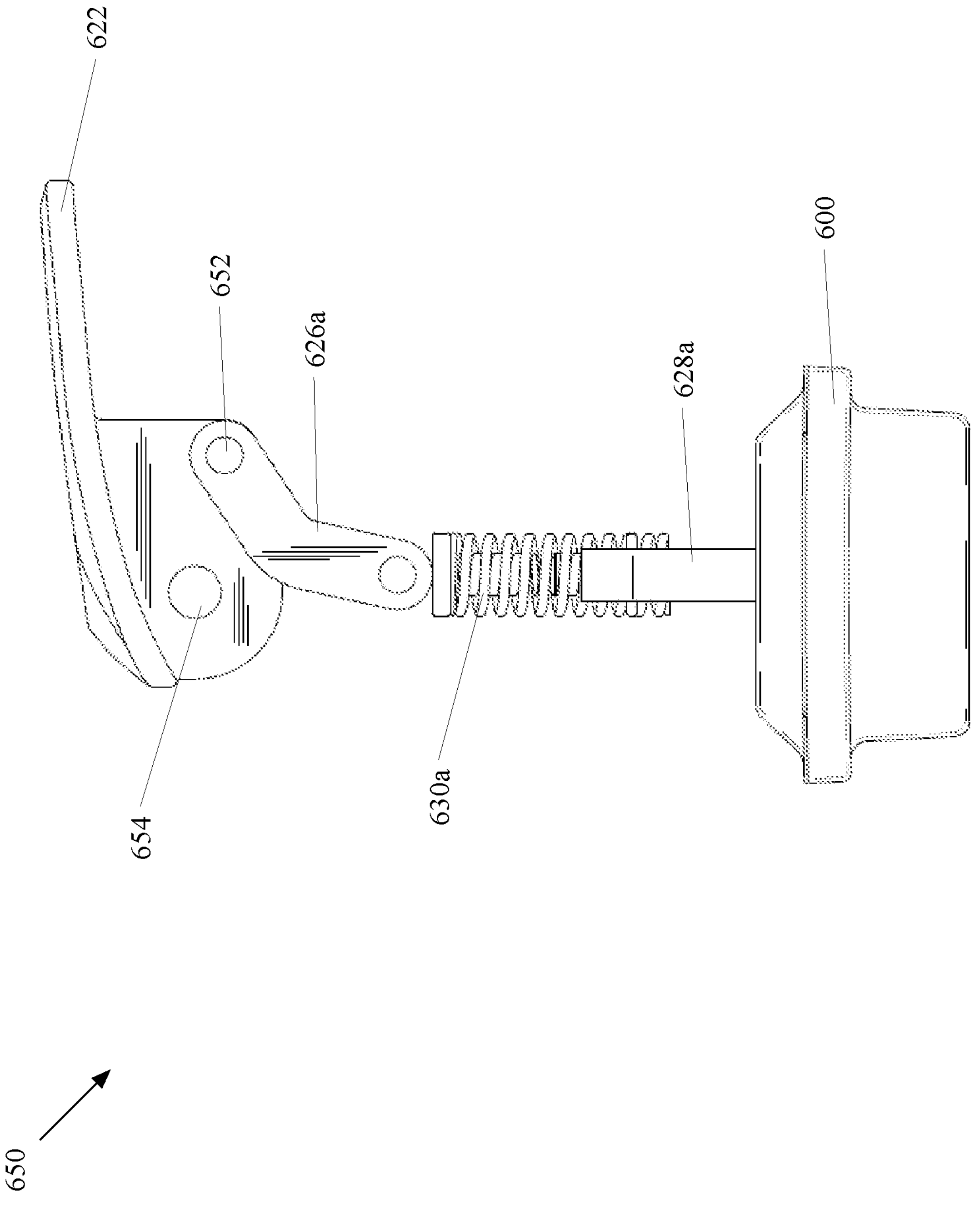
FIG. 6B illustrates a left side view of the two hook structure of the accessory 620 for coupling with the accessory port.

FIG. 6B illustrates a left side view of the two hook structure 650 of the accessory 620 for coupling with the accessory port 600. As described above, to secure the accessory 620, the lever 622 may be pushed downwards when the lever is in the open position, which may in turn push the spring loaded push bar 626*a* downwards. The hook 628*a* may then be pushed outwards and upwards toward the striker bar 602*a* of the accessory port 600. Once the hook 628*a* has made contact with the striker bar 602*a*, as well as the corresponding hook 628*b* on the right side of the accessory 620 making contact with the other striker bar 602*b*, the spring 630*a* may begin to compress and may continue to compress until the lever 622 reaches a closed position and thus has reached an over-center position. As the lever 622 is pushed downward, a point 652 on the lever 622 may begin to rotate around a center of rotation 654 for the lever 622. The point 652 may begin on the right side of the center of rotation 654, and as the lever 622 continues to be pushed downwards, the point 652 may continue rotating clockwise around the center of rotation 654 until the lever 622 is fully closed and the point 652 has reached a position to the left of the center of rotation 654. The over-center position may be when the point 652 has reached the position to the left of the center of rotation 654.

Figure 6C:
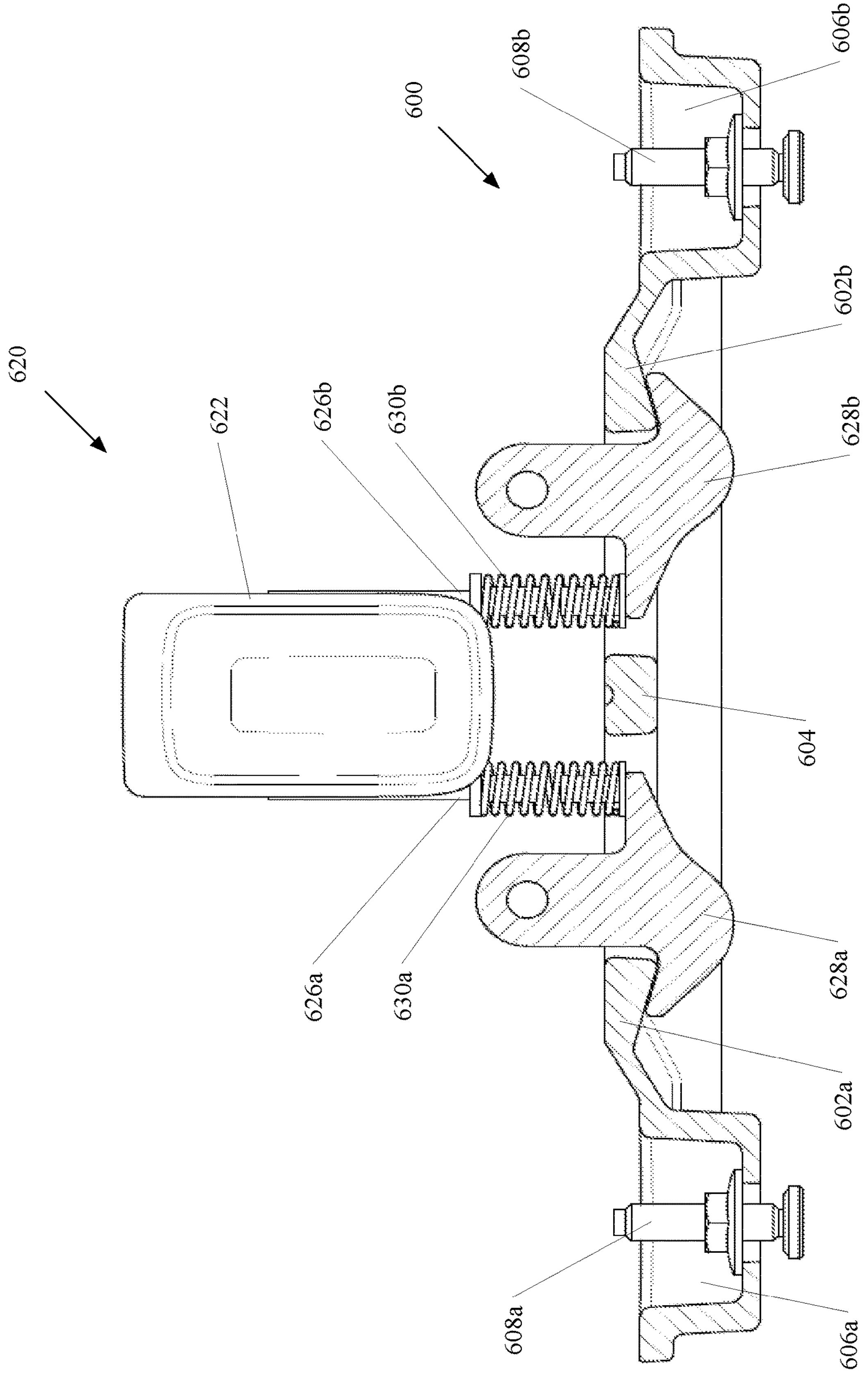
FIG. 6C illustrates a front cross-section view of the accessory coupled to the accessory port after the latch of the accessory has been pushed closed and has reached the over-center position.

FIG. 6C illustrates a front cross-section view of the accessory 620 coupled to the accessory port 600 after the lever 622 has been fully pushed downwards into the closed position and has reached the over-center position. With the lever 622 pushed downwards into the closed position, the spring loaded push bars 626*a* and 626*b* may also be pushed downwards to their lowest position, and the hooks 628*a* and 628*b* that may be pushed outwards may have made contact with the striker bars 602*a* and 602*b*. With the hooks 628*a* and 628*b* pressed against the striker bars 602*a* and 602*b*, the accessory 620 may not be able to be pulled upwards without the lock cylinder being unlocked, the lever 622 being lifted and the hooks 628*a* and 628*b* rotating away from the striker bars 602*a* and 602*b*, thus allowing the accessory 620 to be securely coupled to the accessory port 600. As such, the hooks 628*a* and 628*b* may also be considered the connectors of the accessory 620 that are configured to couple the accessory 620 to the accessory port 600. In various embodiments where the accessory port 600 may include electrical contacts on the underside of the striker bars 602*a* and 602*b*, the ends of the hooks 628*a* and 628*b* may also make contact with those electrical contacts. In such embodiments, as the hooks 628*a* and 628*b* make contact with the electrical contacts of the accessory port 600, the hooks 628*a* and 628*b* may slide along the accessory port's electrical contacts to debride the electrical contacts' surface. In other words, the connectors of the accessory 620 may be configured to debride the surface of the accessory port's electrical contacts while the accessory 620 is coupling to the accessory port 600. This may prevent dirt and grime from building up on the accessory port's electrical contacts and may debride any mild corrosion that may have already built up on the accessory port's electrical contacts.

Figure 6D:
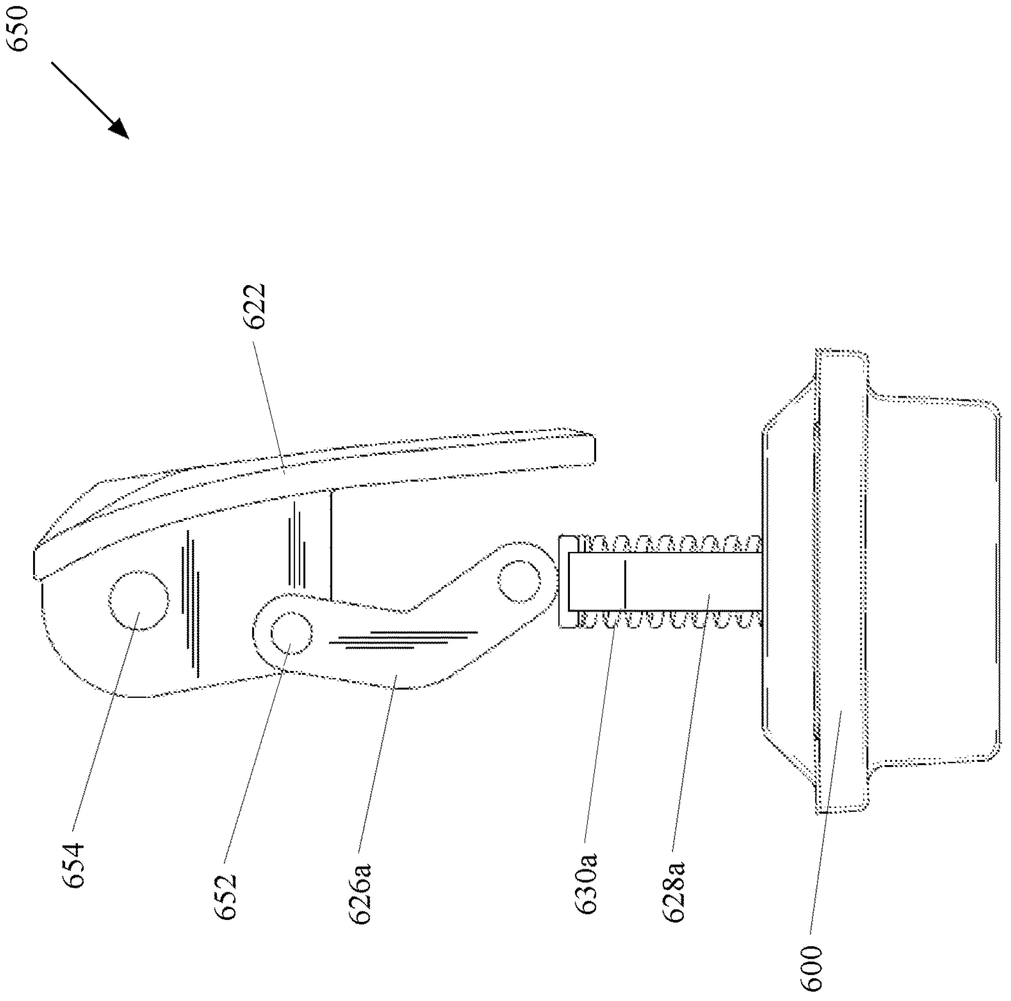
FIG. 6D illustrates a left side view of the two hook structure of the accessory after the latch of the accessory has reached the over-center position.

FIG. 6D illustrates a left side view of the two hook structure 650 of the accessory 620 after the lever 622 has reached the over-center position. In the over-center position, the point 652 on the lever 622 may be positioned to the left of the center of rotation 654, whereas the point 652 may be positioned to the right of the center of rotation 654 when the lever is still in the open position before it has been pushed downwards, as shown in FIG. 6B. With the lever 622 in the over-center position, the spring loaded push bar 626*a* may be pushed downward to its lowest position. The hook 628*a* may be pushed outwards and upwards and may be in contact with the striker bar 602*a*, and thus may be at a higher position that partially overlaps the spring 630*a* from the left side perspective. Additionally, the lever 622 in the over-center position may mean that even if the accessory 620 is pulled upwards, the lever 622 does not accidentally release and rotate back to the open position, further securing the accessory 620 to the accessory port 600.

Figure 7A:
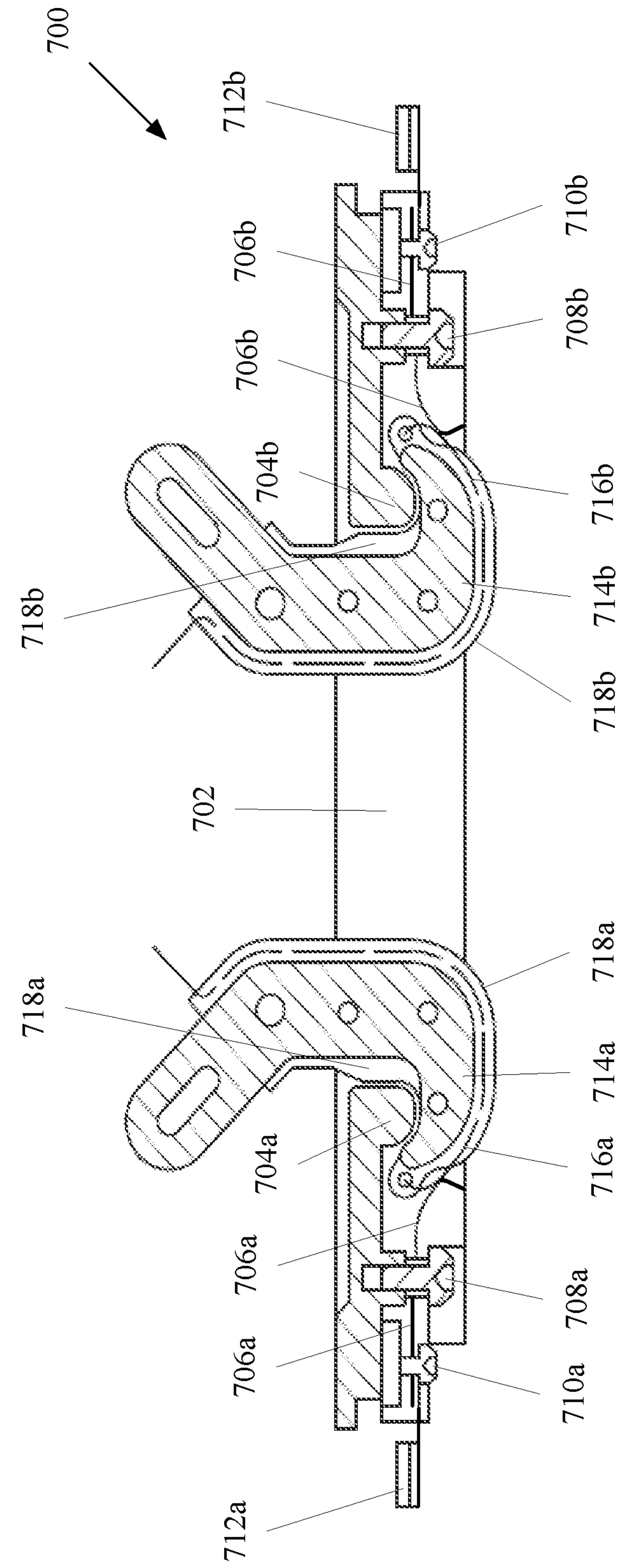
FIG. 7A illustrates an enlarged front cross section view of the hooks of an accessory coupled to an accessory port.

FIG. 7A illustrates an enlarged front cross section view of the hooks of an accessory, such as the hooks 628*a* and 628*b* of accessory 620 of FIGS. 6A and 6C, coupled to an accessory port 700. The hooks 714*a* and 714*b* may correspond to the hooks 628*a* and 628*b* of the accessory 620 after the lever 622 of the accessory 620 has been pushed downwards into the closed position and has reached the over center position. The accessory port 700 may include an opening that the hooks 714*a* and 714*b* of the accessory may be positioned through. The opening may be surrounded by a wall 702 that extends around the accessory port 700, where the wall 702 may correspond to the wall 550 of FIG. 5. The accessory port 700 may also include striker bars 704*a* and 704*b* that the hooks 714*a* and 714*b* couple with to physically secure the accessory to the accessory port 700.

The accessory port 700 may include electrical contacts 706*a* and 706*b* that corresponding electrical contacts of the accessory may come into contact with to electrically couple the accessory with the accessory port 700. In various embodiments, the electrical contacts 706*a* and 706*b* may be sheet metal electrical contacts that have been bent into a specific form to be able to come into contact with the corresponding electrical contacts of an accessory. In various other embodiments, the electrical contacts 706*a* and 706*b* may also be electrical wires or spring finger electrical contacts, although many other implementations may be appropriate. The electrical contacts 706*a* and 706*b* may be secured in place with fasteners 708*a* and 708*b*, such as screws. The electrical contacts 706*a* and 706*b* may extend past the fasteners 708*a* and 708*b* and may also be secured by additional fasteners 710*a* and 710*b*. The accessory port 700 may also include electrical connectors 712*a* and 712*b*, such as ring terminals, that are also secured in place by the fasteners 710*a* and 710*b*. The electrical connectors 712*a* and 712*b* may come into contact with the electrical contacts 706*a* and 706*b* and the fasteners 710*a* and 710*b* may help keep them in contact with one another to maintain a steady flow of electrical power from a power supply.

With the hooks 714*a* and 714*b* pressed against the striker bars 704*a* and 704*b*, the hooks, and consequently the accessory that the hooks may be part of, may not be pulled upwards, thus securing the accessory to the accessory port 700. The hooks 714*a* and 714*b* may be the mechanical component that couples with the striker bars 704*a* and 704*b* to physically secure the accessory to the accessory port 700. The hooks 714*a* and 714*b* may include the electrical contacts 716*a* and 716*b* for the accessory that may come into contact with the electrical contacts 706*a* and 716*b* of the accessory port 700 to electrically couple the accessory with the accessory port 700. In various embodiments, the electrical contacts 716*a* and 716*b* may also be sheet metal electrical contacts that have been bent to conform to the shape of the hooks 714*a* and 714*b*. In various other embodiments, the electrical contacts 716*a* and 716*b* may also be electrical wires that extend along the body of the hooks 714*a* and 714*b*. The electrical contacts 716*a* and 716*b* may be surrounded by insulating layers 718*a* and 718*b* to insulate and/or protect the electrical contacts 716*a* and 716*b* from the environment. The insulating layers 718*a* and 718*b* may be constructed from any electrical insulator material, such as plastic. While the insulating layers 718*a* and 718*b* may surround most of the electrical contacts 716*a* and 716*b*, part of the electrical contacts 716*a* and 716*b* may be exposed so they may come into contact with the electrical contacts 706*a* and 706*b* of the accessory port 700.

Figure 7B:
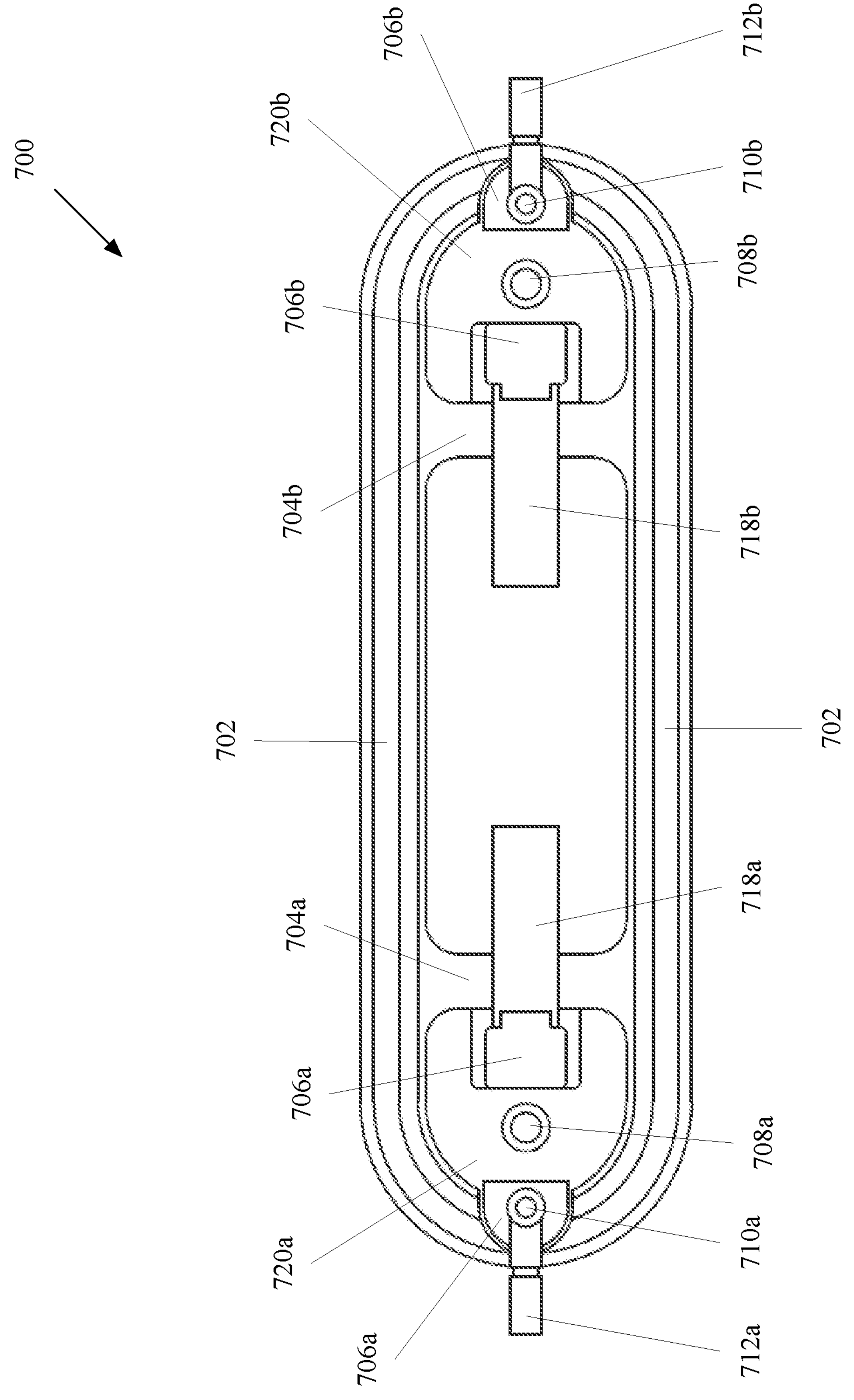
FIG. 7B illustrates a bottom view of the hooks of an accessory coupled to an accessory port.

FIG. 7B illustrates a bottom view of the hooks of an accessory, such as the accessory 620 of FIGS. 6A and 6C, coupled to an accessory port 700. As described above, the accessory port 700 may include an opening where the hooks 714*a* and 714*b* of an accessory may be positioned through, and may be surrounded by a wall 702 that extends around the accessory port 700. Striker bars 704*a* and 704*b* may be positioned on either side of the opening which the hooks 714*a* and 714*b* of an accessory may couple with to secure the accessory to the accessory port 700. Since FIG. 7B presents a bottom view of the accessory port 700, the hooks 714*a* and 714*b* being surrounded by the insulating layers 718*a* and 718*b* may result in the insulating layers being visible instead of the hooks 714*a* and 714*b* themselves. The accessory port 700 may include electrical contacts 706*a* and 706*b* for electrically coupling an accessory with the accessory port 700, which may be secured in place by fasteners 708*a* and 708*b*. The accessory port 700 may also include insulating components 720*a* and 720*b* that are also secured in place by the fasteners 708*a* and 708*b*. The insulating components 720*a* and 720*b* may be positioned below the electrical contacts 706*a* and 706*b* to insulate and/or protect the contacts from the surrounding environment. The electrical contacts 706*a* and 706*b* may be further secured in place by additional fasteners 710*a* and 710*b*, which may simultaneously secure electrical connectors 712*a* and 712*b* in place to keep the electrical contacts 706*a* and 706 in contact with the electrical connectors 712*a* and 712*b*. The exposed part of the accessory's electrical contacts 716*a* and 716*b* may make contact with the upper side of the electrical contacts 706*a* and 706*b* and thus may not be readily visible from a bottom perspective as shown in FIG. 7B.

Figure 8:
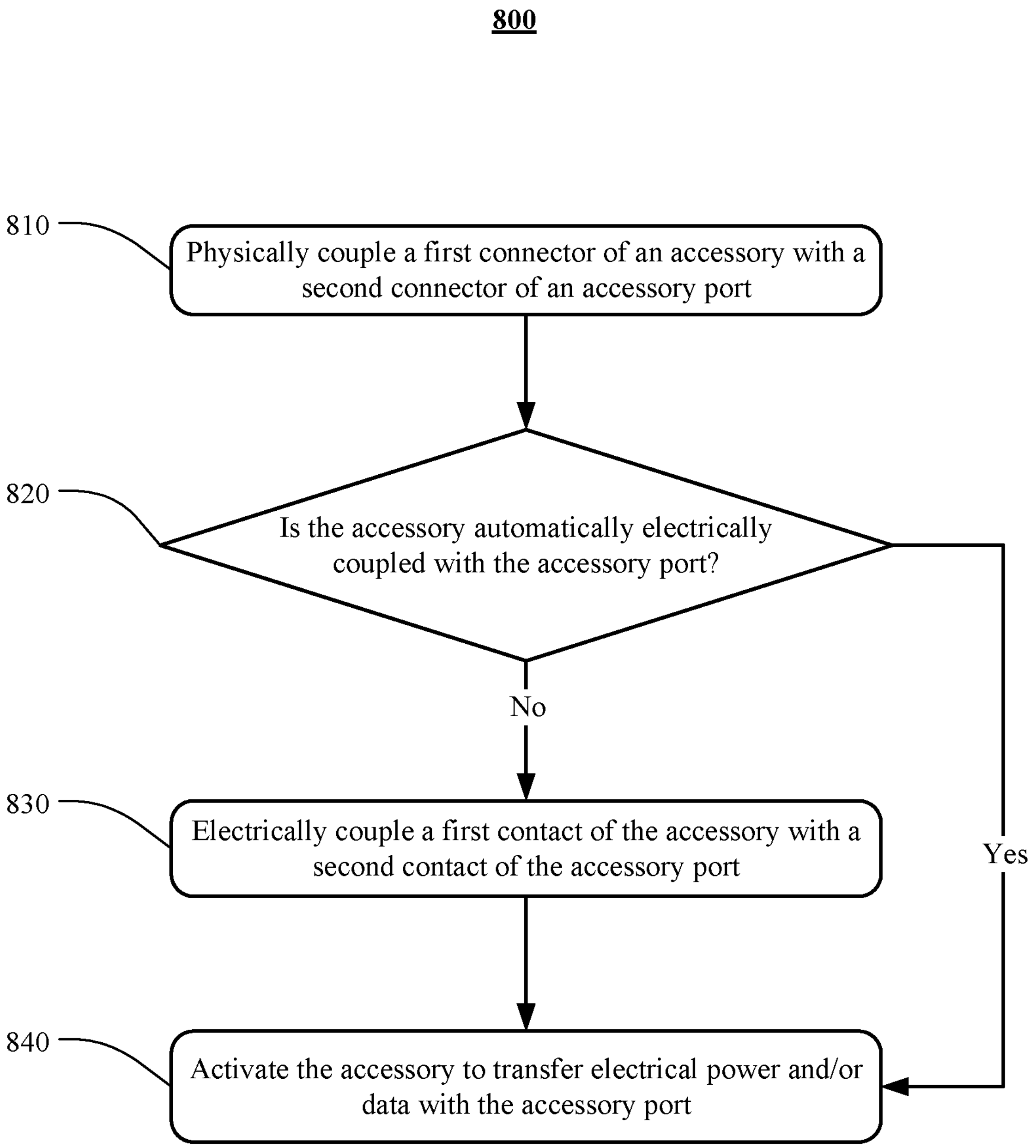
FIG. 8 illustrates a method for coupling an accessory to an accessory port of a vehicle.

FIG. 8 illustrates a method 800 for coupling an accessory to an accessory port of a vehicle. The accessory may be any of the example accessories described above, and the accessory port may also be any of the example accessory ports described above. The method 800 may begin at step 810 to physically couple a first connector of an accessory with a second connector of an accessory port. Physically coupling the first and second connectors may physically secure the accessory to the accessory port. The first and second connectors may be different components in different embodiments, so physically coupling the first and second connectors may involve different operations. For example, and referring back to the example of FIG. 6A, the first connector of the accessory may be hooks, while the second connector of the accessory port may be striker bars, where the hooks of the accessory hook onto the striker bars of the accessory port to physically couple the accessory to the accessory port. The hooks of the accessory may be controlled by a latch, and thus physically coupling the first connector at step 810 may include positioning the accessory before pushing down the latch on the accessory to physically couple and secure the accessory in place. In various other embodiments, the first and second connectors may automatically couple once the accessory and accessory port are in position, so step 810 may include positioning the accessory in the correct position with respect to the accessory port, but may not include a subsequent operation once the accessory is in position.

At step 820, a determination may be made on whether the accessory is automatically electrically coupled with the accessory port as a result of the accessory physically coupling to the accessory port. The accessory being electrically coupled to the accessory port may mean the accessory is capable of transferring electrical power and/or data with the accessory port. This may be the case in embodiments where the electrical components of the accessory are configured to be coupled at the same time that the connectors are coupled. For example, and referring to the example in FIG. 1A, the accessory may include electrical contacts that are positioned and oriented to automatically touch the corresponding electrical contacts on the accessory port, where the accessory becomes electrically coupled to the accessory port when the two sets of electrical contacts make contact. The accessory may also be automatically electrically coupled to the accessory port in embodiments where the process of physically coupling and electrically coupling are controlled by a single operation, and thus performing the operation to physically couple the accessory at step 810 resulted in the accessory also being electrically coupled. This may be the case in embodiments such as that of FIG. 6A where pushing the latch down both physically couples and electrically couples the accessory to the accessory port, while the accessory in various other embodiments may be separately electrically coupled.

If a determination is made at step 820 that the accessory is not automatically electrically coupled with the accessory port, method 800 may proceed to step 830 to electrically couple a first contact of the accessory with a second contact of the accessory port, which may allow the accessory to transfer electrical power and/or data with the accessory port. Electrically coupling the accessory may involve different operations depending on the type of electrical contacts, and may include adjusting various components of the accessory and/or the accessory port to allow the first contact to touch the second contact. For example, in an embodiment of a pin and socket interconnection with a wired pin as the first contact of the accessory as described with respect to FIG. 1B, electrically coupling the first contact of the accessory may mean coupling the wired pin of the accessory with the socket, which may be the second contact of the accessory port.

After the accessory is electrically coupled with the accessory port, method 800 may proceed to step 840 to activate the accessory to transfer electrical power and/or data with the accessory port. If, at step 820, the determination was made that the accessory is automatically electrically coupled with the accessory port after being physically coupled at step 810, the method 800 may proceed directly from step 820 to step 840 to activate the accessory. Since the accessory may already be electrically coupled to the accessory port as a result of physically coupling to the accessory port at step 810, method 800 may not need to execute step 830 to electrically couple the accessory again, and thus the accessory may be activated after physically coupling to the accessory port at step 810.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for coupling an accessory to an accessory port of a vehicle including the particular steps of the method of FIG. 8, this disclosure contemplates any suitable method for coupling an accessory to an accessory port of a vehicle including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
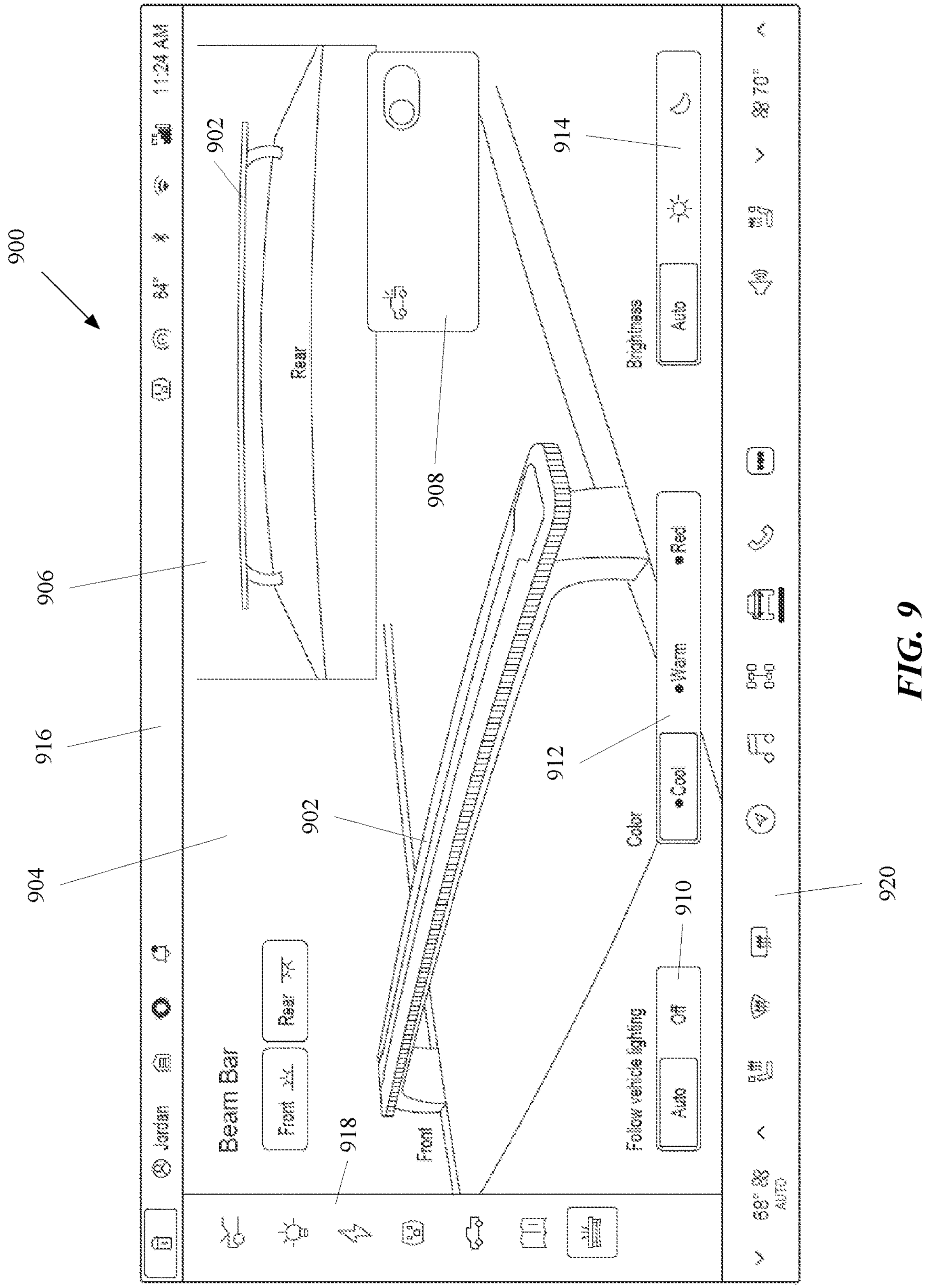
FIG. 9 illustrates a user interface that may be associated with an accessory port on a vehicle.

FIG. 9 illustrates a user interface 900 that may be associated with an accessory port on a vehicle. The user interface may be the infotainment system of the vehicle, a mobile device, or any other electronic device that may connect with the accessory port of the vehicle. The user interface 900 may allow a user to remotely control operation of an accessory that may be coupled with the accessory port, as well as provide various information about the accessory. Controlling operation of the accessory may include controlling activation/deactivation of the accessory or various controllable features of the accessory, among many others. In the user interface 900, a bar accessory 902 with lighting capabilities may be coupled with the accessory port. The user interface 900 may include a section 904 that displays a perspective front view of the bar accessory 902 that may be coupled with the accessory port. The section 904 may display the bar accessory 902 because the accessory may currently be coupled with the accessory port, but the section 904 may stop displaying the bar accessory 902 once it has been removed and only display the vehicle surface and the accessory port of the vehicle. That is, the accessory port, the user interface 900, and/or the vehicle may detect if and when an accessory such as the bar accessory 902 is coupled with the accessory port, and then identify the accessory to update the user interface 900 accordingly. Alternatively, the user interface 900 may receive data regarding the status of the accessory port from the accessory port and/or the vehicle and update accordingly based on the data. The user interface 900 may also receive an indication of whether an accessory is coupled with the accessory port via a manual toggle. The manual toggle may be on the user interface 900, which a user may interact with to inform the user interface 900 that an accessory has been coupled or decoupled with the accessory port, or the manual toggle may be a physical component on the accessory or accessory port, such as the mechanical indicator described above with respect to FIG. 3, that may be activated or deactivated when the accessory has been coupled and decoupled with the accessory port to inform the user interface 900. The user interface 900 may then be updated accordingly based on whether the manual toggle indicates an accessory is coupled with the accessory port or not. The section 904 may also display the bar accessory 902 in various ways to reflect any changes to the bar accessory 902. For example, when the bar accessory 902 is not activated and is not producing any light, the section 904 may display the bar accessory 902 as such. When the bar accessory 902 is activated and is producing light, the section 904 may illuminate the bar accessory 902 to reflect that change. Additionally, if the bar accessory 902 is capable of producing different colors of light, the section 904 of the user interface 900 may also display different lights corresponding to the light color currently produced by the bar accessory 902.

The user interface 900 may include a section 906 that displays a rear view of the accessory port and any accessory, such as the bar accessory 902, that may be coupled with the accessory port. Similar to section 904, section 906 may also update accordingly based on whether an accessory is currently coupled with the accessory port, as well as reflect any changes to the accessory. The bar accessory 902 may currently be coupled with the accessory port, and thus the section 906 may display a rear view of the bar accessory 902.

The user interface 900 may also include various sections for controlling different aspects of an accessory that may be coupled with the accessory port. For example, the user interface 900 may include a section 908 for controlling the activation and deactivation of the bar accessory 902. The section 910 may control whether the lights of the bar accessory 902 follows the vehicle lighting. With this section set to auto, the lighting from the bar accessory 902 may activate when the vehicle lights activate and similarly deactivate when the vehicle lights deactivate. The bar accessory 902 may also have different illumination levels, and may adjust to a lower illumination level when the vehicle lighting is set to a low beam level but adjust to a higher illumination level when the vehicle lighting is switched to a high beam level. The section 912 may control the hue for the lighting from the bar accessory 902. With this section set to cool, the lighting from the bar accessory 902 may currently have a cool hue. The section 914 may control the brightness of the lighting from the bar accessory 902. With this section set to auto, the light brightness may adjust automatically given various conditions, such as the lighting in the environment that the vehicle is currently passing through.

The user interface 900 may also be integrated with the interfaces and/or controls for various other aspects of the vehicle or the bar accessory 902, and thus may include various other sections that may not be strictly associated with controlling operation of the bar accessory 902. For example, the user interface 900 may include a section 916 for interacting with various utility functions associated with the vehicle, such as accessing a user profile for the user of a vehicle, changing the notification settings for receiving various notifications from the user interface 900, controlling Bluetooth functionality, among many others. The user interface 900 may be able to transmit various types of notifications to user electronic devices with data regarding the accessory port. For example, if the accessory port includes a cover for protecting the electrical contacts of the accessory port when decoupled with an accessory, such as in the example of FIG. 3, but the cover is open despite there being no accessory coupled with the accessory port, the user interface 900 may display a notification or transmit a notification to a user electronic device informing the user of the open cover. Alternatively, an accessory coupled with the accessory port may remain activated after the accessory port has been deactivated, so the user interface 900 may display or transmit a corresponding notification to a user electronic device to inform the user of that fact. The user interface 900 may also include a section 918 for navigating to different pages of the user interface 900, where the current page may be specifically directed to controlling an accessory coupled with the accessory port of the vehicle. The user interface 900 may also include a section 920 for various miscellaneous vehicle settings, such as air vent temperature or speaker levels.

The sections may be 916, 918, and 920 may be described herein for interacting with vehicle utility functions, but in various other embodiments, the sections 916, 918, and 920 may control various other aspects of the bar accessory 902 that may not be available on the same page as those shown and described above. Additionally, the sections 916, 918, and/or 920 in various embodiments may also control various aspects of other accessories that may also be coupled with the accessory port of the vehicle. This may be the case where the accessory port may support multiple accessories simultaneously being coupled at any given time, where the sections 916, 918, and/or 920 may support navigating to and controlling the other accessories besides the bar accessory 902 currently displayed on the given page. Although the user interface 900 as described herein may include various sections with particular functions, it should be noted that various other embodiments may include various other sections with functions that may be similar or different than those described herein. For example, various embodiments may include any view of the accessory that may be coupled with the accessory port of the vehicle, in addition to or instead of a front and rear view. Various embodiments may also include a greater or fewer number of sections than those shown and described herein, where the sections may also be arranged in any layout.

As described herein, an accessory port of a vehicle may transfer electrical power and/or data with a powered accessory when the accessory is coupled with the accessory port. With electrical power being transferred, it may be advantageous to authenticate an accessory by evaluating whether an accessory is authorized to couple with the accessory port to ensure electrical safety. This may help to ensure that unsafely designed accessories do not couple with and attempt to transfer electrical power from the accessory port.

Figure 10:
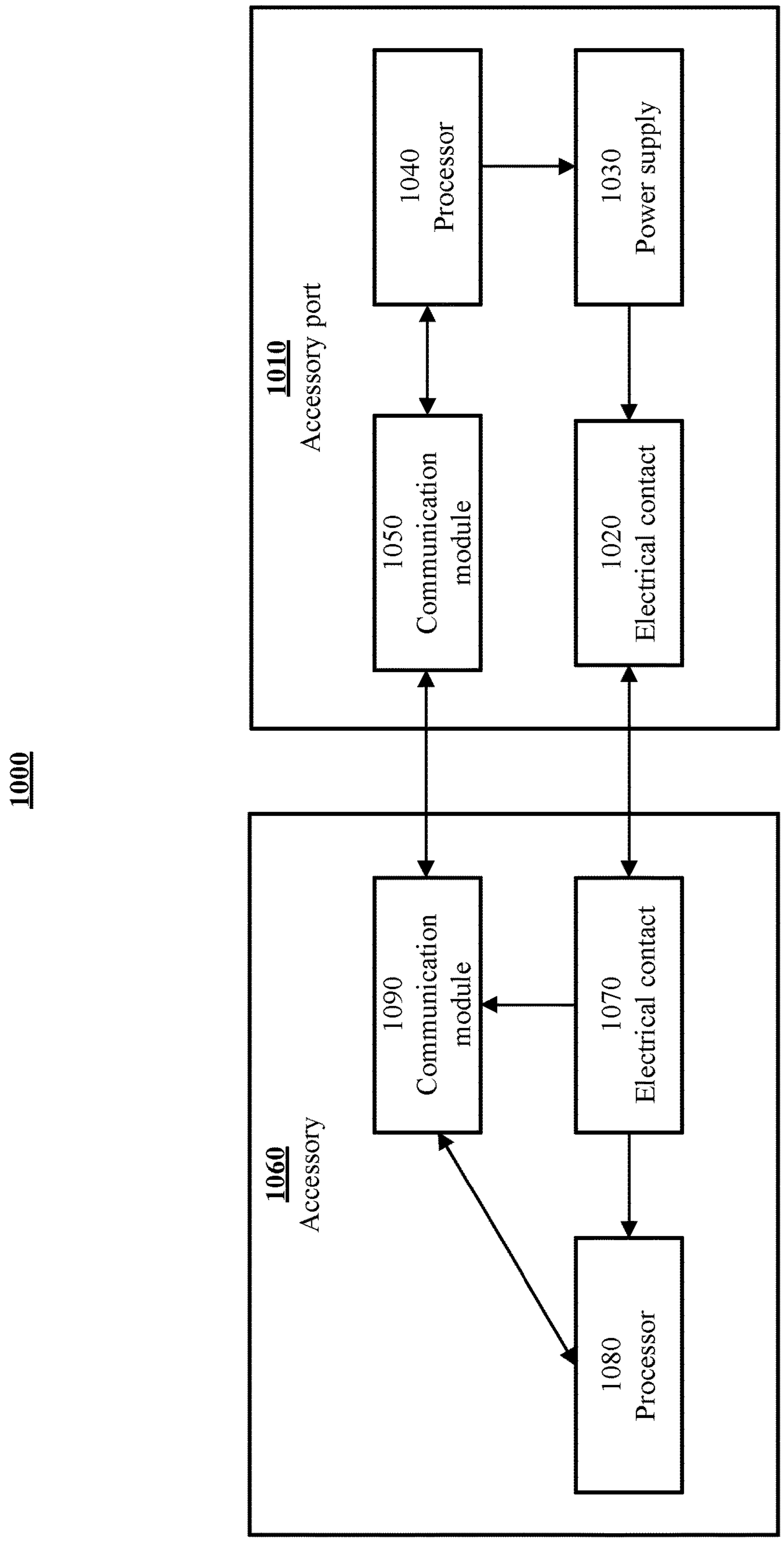
FIG. 10 illustrates a schematic of various additional components that an example accessory port and an accessory may include for the accessory port to authenticate the accessory.

FIG. 10 illustrates a schematic 1000 of various additional components that an example accessory port 1010 and an accessory 1060 may include for the accessory port 1010 to authenticate the accessory 1060 as one that is authorized to couple with the accessory port 1010. The accessory port 1010 may include an electrical contact 1020 that electrically couples with the electrical contact 1070 of the accessory 1060 to transfer electrical power from a power supply 1030 (such as a battery of the vehicle) to the accessory 1060. The electrical contact 1020 may form an electrical circuit when it touches the electrical contact 1070 of the accessory that allows an electric current to flow from the power supply 1030 to the accessory 1060.

The accessory port 1010 may include a processor 1040 that may be configured to authenticate the accessory 1060 by executing instructions to analyze data about the accessory 1060, or accessory data, and determine whether the accessory 1060 is authorized to couple with the accessory port 1010. Whether the accessory 1060 is authorized to couple with the accessory port 1010 may depend on whether the accessory 1060 meets a predetermined threshold, and the processor 1040 may analyze the accessory data to determine whether the accessory 1060 meets that predetermined threshold. The accessory data that the processor 1040 analyzes may include the make or model of the accessory 1060, data about any software that may be running on the accessory 1060, component limitations such as the maximum electrical load supported by the accessory 1060, among many others. To meet the threshold, the accessory model may need to be on a whitelist of authorized accessory models, the accessory software may need to be at least a specific version, or the accessory's maximum electrical support load may need to be a certain amount, among many others.

The processor 1040 may also interface with the power supply 1030 to control the electrical power supplied to the accessory 1060 based on whether the accessory 1060 is authenticated. That is, the processor 1040 may cause the power supply 1030 to withhold electrical power upon determining that the accessory 1060 is not authorized to couple with the accessory port 1010, and cause the power supply 1030 to supply electrical power to the accessory 1060 upon determining that the accessory 1060 is authorized to couple with the accessory port 1010. This may mean the processor 1040 is also configured to control the electrical power that is supplied to the accessory 1060 via the electrical contact 1020. The processor 1040 may also control various aspects of the electrical power supplied from the power supply 1030 to the accessory 1060. For example, the processor 1040 may control how much electrical power is supplied, when to supply the electrical power (such as only after the accessory 1060 has been authenticated and not immediately after the accessory 1060 electrically couples with the accessory port 1010), the frequency with which to supply electrical power (such as through multiple separate flows instead of a continuous flow to conserve electrical power), among many others. The processor 1040 may also adjust the electrical power supplied based on various conditions, such as which driving mode the vehicle is in or what the external weather is, among many others. In various embodiments, the processor 1040 may be a computing unit specifically for authenticating the accessory 1060, such as an application-specific integrated circuit (ASIC), or a more general computing unit, such as a central processing unit (CPU).

The accessory port 1010 may include a communication module 1050 that communicates with the accessory 1060 to transfer data between the accessory 1060 and accessory port 1010. The processor 1040 may then interface with the communication module 1050 to retrieve accessory data, and may also forward any data or commands intended for the accessory 1060 to the communication module 1050 to be transmitted to the accessory 1060. The communication module 1050 may be implemented in various ways depending on the authentication method of different embodiments. For example, the communication module 1050 may be implemented as a wireless transceiver that wirelessly communicates with the accessory 1060, such as through Bluetooth or Wi-Fi. Alternatively, the communication module 1050 may be a radio wave sensor that detects the radio waves emitted by the accessory 1060. In addition to those described herein, many other implementations may be appropriate for transferring data from the accessory 1060 to the accessory port 1010 for the processor 1040 to determine whether the accessory is authorized to couple with the accessory port.

Although the processor 1040 and the communication module 1050 are illustrated as separate components, in various embodiments, the two components may be integrated. For example, the processor 1040 may include the functionality of the communication module 1050, or the communication module 1050 may be a subcomponent of the processor 1040. Alternatively, the processor 1040 and communication module 1050 may be separate subcomponents that are integrated together into another computing unit, such as a vehicle control unit. The accessory port 1010 may also be illustrated as incorporating the various components 1020-1050, but various embodiments may separate some components from the accessory port 1010. For example, the processor 1040 may not be integrated as part of the accessory port 1010, and may instead be part a separate vehicle computing unit, but is still able to access the accessory data received by the communication module 1050 and analyze the data to authenticate the accessory 1060.

As described above, the accessory 1060 may include an electrical contact 1070 that may form an electrical circuit with the electrical contact 1020 to electrically couple the accessory 1060 with the accessory port 1010. The electrical circuit formed from the electrical contacts 1020 and 1070 may allow an electrical current to flow from the power supply 1030 to the accessory 1060, and thus supplying electrical power to the accessory 1060. The electrical power may power the processor 1080 and the communication module 1090 in some embodiments, such as if the communication module 1090 is a wireless transceiver. The processor 1080 may process incoming messages from the accessory port 1010 as well as generate outgoing messages to the accessory port 1010, where the outgoing messages may be sent to the communication module 1090 which then transmits to the accessory port 1010. The incoming messages from the accessory port 1010 may include requests for accessory data to authenticate the accessory 1060. The processor 1080 may process the request, identify and retrieve the relevant accessory data, and then send a message with the data to the communication module 1090 to be transmitted to the accessory port 1010. The communication module 1090 may communicate with the corresponding communication module 1050 of the accessory port 1010 to transfer data between the accessory 1060 and the accessory port 1010. The communication module 1090 may also be implemented in various ways, where the implementation may correspond with the communication module 1050 of the accessory port 1010 to allow data to be transferred between the accessory 1060 and accessory port 1010. For example, the communication module 1050 of the accessory port 1010 may be implemented as a wireless transceiver, with the communication module 1090 of the accessory 1060 also implemented as a wireless transceiver. Thus, the communication modules 1050 and 1090 may transfer data through transmitting and receiving wireless signals from one another. Alternatively, the communication module 1050 may be implemented as a radio wave sensor, with the communication module 1090 implemented as a radio wave emitter. Thus, the communication module 1090 may transfer data by emitting radio waves that are subsequently detected by the communication module 1050.

Figure 11:
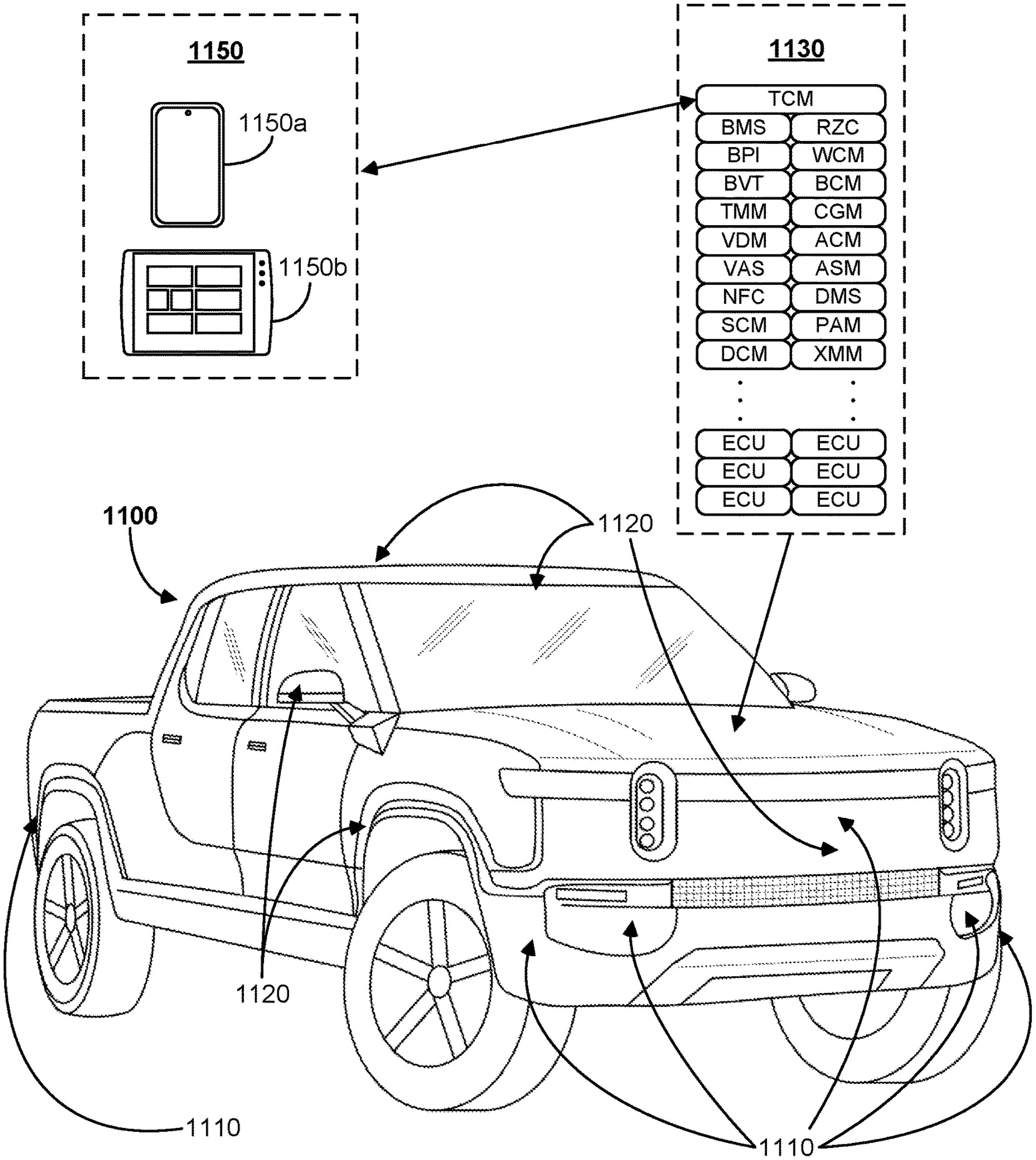
FIG. 11 illustrates an example vehicle.

FIG. 11 illustrates an example vehicle 1100. Vehicle 1100 may include multiple sensors 1110, multiple cameras 1120, and a control system 1130. In some embodiments, vehicle 1100 may be able to pair with a computing device 1150 (e.g., smartphone 1150*a*, tablet computing device 1150*b*, or a smart vehicle accessory). As an example and not by way of limitation, a sensor 1110 may be an accelerometer, a gyroscope, a magnetometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 1120 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 1100 may include various controllable components (e.g., doors, seats, windows, lights, HVAC, entertainment system, security system), instrument and information displays and/or interactive interfaces, functionality to pair a computing device 1150 with the vehicle (which may allow control of certain vehicle functions using the computing device 1150), and functionality to pair accessories with the vehicle, which may then be controllable through an interactive interface in the vehicle or through a paired computing device 1150.

Control system 1130 may allow control of various systems on-board the vehicle. As shown in FIG. 11, control system 1130 may comprise one or more electronic control units (ECUs), each of which are dedicated to a specific set of functions. Each ECU may be a computer system (as described further in FIG. 11), and each ECU may include functionality provide by one or more of the example ECUs described below.

Features of embodiments as described herein may be controlled by one or more ECUs that provide functionality to control access to the vehicle. A Vehicle Access System (VAS) ECU may provide passive/active wireless sensors (e.g., Bluetooth) authorizing accessing (i.e., locking or unlocking) the vehicle. A Near-Field Communication (NFC) ECU may support an NFC reader embedded in the vehicle (e.g., in the driver-side exterior door handle or in the armrest of the interior, driver-side door panel) for user authentication.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 1150, in-vehicle navigation, vehicle-to-vehicle communication, communication between the vehicle and landscape features (e.g., automated toll road sensors, automated toll gates, power dispensers at charging stations), or automated calling functionality.

Features of embodiments as described herein may be controlled by a Rear Zone Control (RZC) ECU. The RZC ECU may provide functionality to control different body components, such as, by way of example and not limitation, a license plate lamp, based on vehicle body type. For vehicles with a truck bed, the RZC ECU may provide functionality to control a tonneau cover, sidebin latch, tailgate latch, sidebin lights, or cargo lamps. For a sport utility-type vehicle with a rear door, the RZC ECU may provide functionality to control liftgate latches, a liftgate actuator, puddle lamps, or a rear wiper. For vehicles with a tow hitch, the RZC ECU may provide functionality to control trailer braking or a trailer brake stop light. For vehicles with a third row of seats, the RZC ECU may provide functionality to control movement of interior components to facilitate easy entry to the rear seats. For a delivery vehicle, the RZC ECU may provide functionality to control movement of a bulkhead door motor and latches, rollup door latches, various lamps, rear stop lights, and turn lights.

Features of embodiments as described herein may be controlled by a Body Control Module (BCM) ECU. The BCM ECU may provide electronic controls for various components of the body of the vehicle, such as, by way of example and not limitation: interior lighting (e.g., cabin lights, seatbelt lights), exterior lighting (e.g., headlamps, side lights, rear lights, camp lights), power outlets, frunk switch, window wiper movement and washer fluid deployment, the overhead center console, horn, power ports, and wireless accessory charging and docking.

Features of embodiments as described herein may be controlled by a Central Gateway Module (CGM) ECU. The CGM ECU may serve as the vehicle's communications hub that connects and transfer data to and from the various ECUs, sensors, cameras, motors, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes. In some embodiments, for electric vehicles, the CGM ECU may also control the vehicle charge port door and related light(s) and sensor(s).

Features of embodiments as described herein may be controlled by an Experience Management Module (XMM) ECU may generate a user interface displayed on a dashboard of the vehicle. The user interface may display information and provide audio output for an infotainment system, including various views around and inside the vehicle. XMM may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC)

controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may allow interaction with other modules of control system 1130.

Vehicle 1100 may include one or more additional ECUs, such as, by way of example and not limitation: a Vehicle Dynamics Module (VDM) ECU, a Seat Control Module (SCM) ECU, a Door Control Module (DCM) ECU, an Autonomy Control Module (ACM) ECU, an Autonomous Safety Module (ASM) ECU, a Driver Monitoring System (DMS) ECU, and/or a Winch Control Module (WCM) ECU. If vehicle 1100 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU.

Figure 12A:
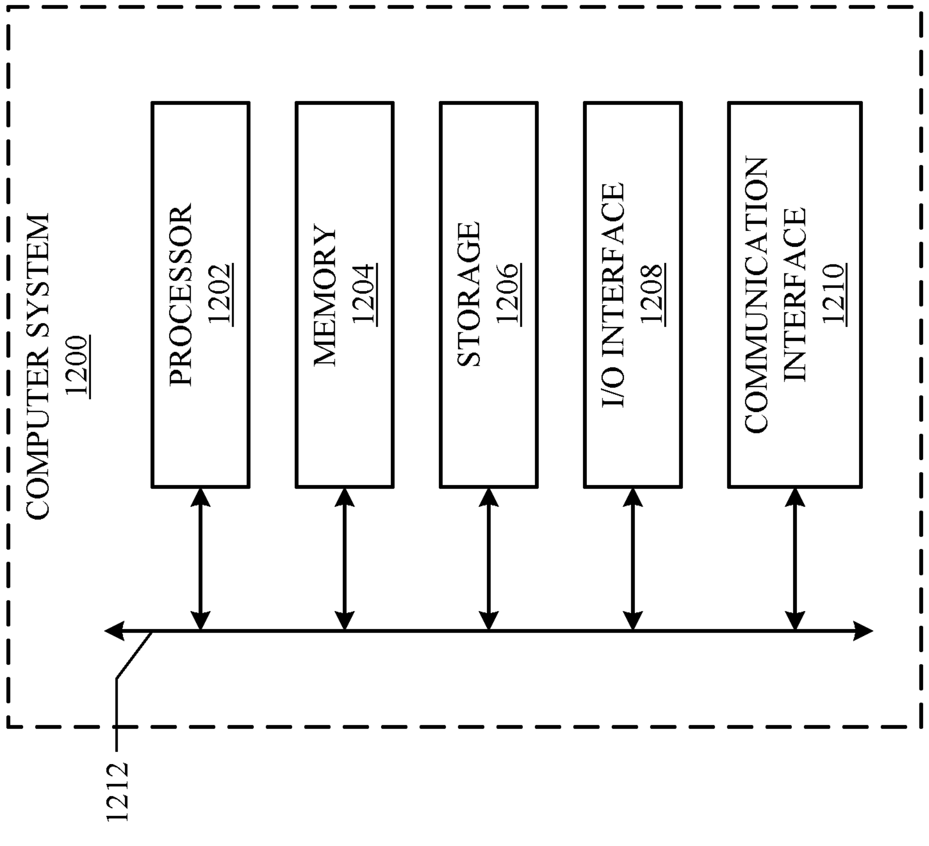
FIG. 12A is a schematic of an example computer system.

FIG. 12A illustrates an example computer system 1200. Computer system 1200 may include a processor 1202, memory 1204, storage 1206, an input/output (I/O) interface 1208, a communication interface 1210, and a bus 1212. Although this disclosure describes one example computer system including specified components in a particular arrangement, this disclosure contemplates any suitable computer system with any suitable number of any suitable components in any suitable arrangement. As an example and not by way of limitation, computer system 1200 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 1200 may include one or more computer systems 1200; be unitary or distributed, span multiple locations, machines, or data centers; or reside in a cloud, which may include one or more cloud components in one or more networks. Where appropriate, computer system(s) 1200 may perform, at different times or at different locations, in real time or in batch mode, one or more steps of one or more methods described or illustrated herein.

Processor 1202 may include hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. Processor 1202 may include one or more internal caches for data, instructions, or addresses.

In particular embodiments, memory 1204 includes main memory for storing instructions for processor 1202 to execute or data for processor 1202 to operate on. In particular embodiments, one or more memory management units (MMUs) reside between processor 1202 and memory 1204 and facilitate accesses to memory 1204 requested by processor 1202. In particular embodiments, memory 1204 includes random access memory (RAM). This disclosure contemplates any suitable RAM.

In particular embodiments, storage 1206 includes mass storage for data or instructions. As an example and not by way of limitation, storage 1206 may include a removable disk drive, flash memory, an optical disc, a magneto-optical disc, magnetic tape, or a Universal Serial Bus (USB) drive or two or more of these. Storage 1206 may include removable or fixed media and may be internal or external to computer system 1200. Storage 1206 may include any suitable form of non-volatile, solid-state memory or read-only memory (ROM).

In particular embodiments, I/O interface 1208 includes hardware, software, or both, providing one or more interfaces for communication between computer system 1200 and one or more input and/or output (I/O) devices. Computer system 1200 may be communicably connected to one or more of these I/O devices, which may be incorporated into, plugged into, paired with, or otherwise communicably connected to vehicle 1100 (e.g., through the TCM ECU). An input device may include any suitable device for converting volitional user input into digital signals that can be processed by computer system 1200, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 1110 described above. An output device may include devices designed to receive digital signals from computer system 1200 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 1208 for them. I/O interface 1208 may include one or more I/O interfaces 1208, where appropriate.

In particular embodiments, communication interface 1210 includes hardware, software, or both providing one or more interfaces for data communication between computer system 1200 and one or more other computer systems 1200 or one or more networks. Communication interface 1210 may include one or more interfaces to a controller area network (CAN) or to a local interconnect network (LIN). Communication interface 1210 may include one or more of a serial peripheral interface (SPI) or an isolated serial peripheral interface (isoSPI). In some embodiments, communication interface 1210 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 1212 includes hardware, software, or both coupling components of computer system 1200 to each other. Bus 1212 may include any suitable bus, as well as one or more buses 1212, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

Figure 12B:
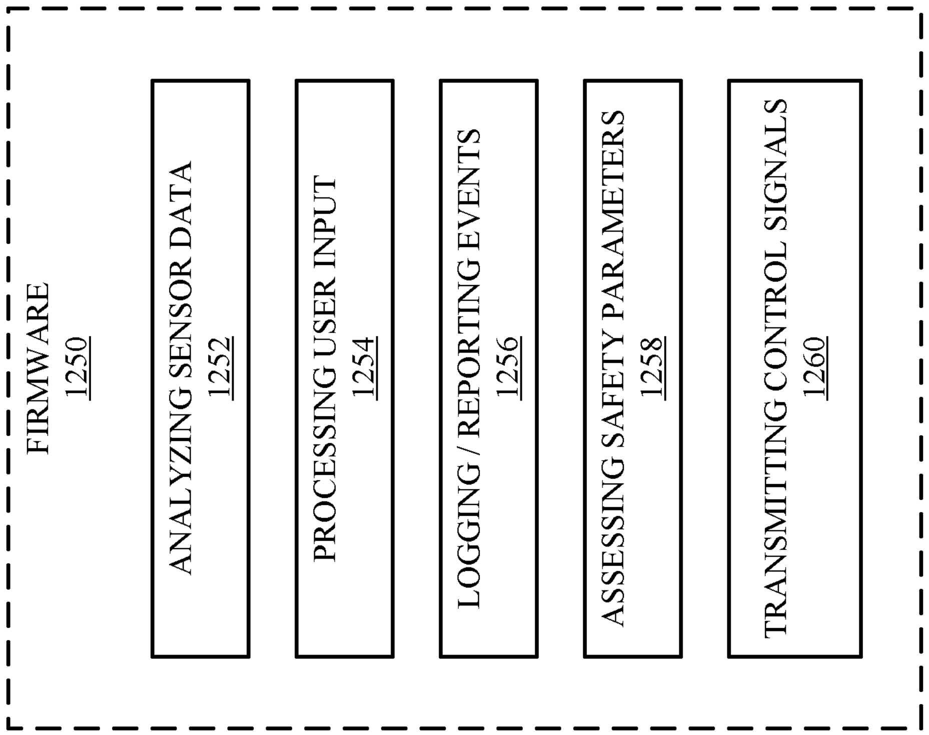
FIG. 12B illustrates example firmware for a vehicle ECU.

FIG. 12B illustrates example firmware 1250 for a vehicle ECU 1200 as described with respect to control system 1130. Firmware 1250 may include functions 1252 for analyzing sensor data based on signals received from sensors 1110 or cameras 1120 received through communication interface 1210. Firmware 1250 may include functions 1254 for processing user input (e.g., directly provided by a driver of or passenger in vehicle 1100, or provided through a computing device 1150) received through I/O interface 1208. Firmware 1250 may include functions 1256 for logging detected events (which may be stored in storage 1206 or uploaded to the cloud), as well as functions for reporting detected events (e.g., to a driver or passenger of the vehicle through an instrument display or interactive interface of the vehicle, or to a vehicle manufacturer, service provider, or third party through communication interface 1210). Firmware 1250 may include functions 1258 for assessing safety parameters (e.g., monitoring the temperature of a vehicle battery or the distance between vehicle 1100 and nearby vehicles). Firmware 1250 may include functions 1260 for transmitting control signals to components of vehicle 1100, including other vehicle ECUs 1200.

Herein, “or” is inclusive and not exclusive, unless expressly indicated otherwise or indicated otherwise by context. Therefore, herein, “A or B” means “A, B, or both,” unless expressly indicated otherwise or indicated otherwise by context. Moreover, “and” is both joint and several, unless expressly indicated otherwise or indicated otherwise by context. Therefore, herein, “A and B” means “A and B, jointly or severally,” unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, allowed to, operable to, or operative to perform a particular function encompasses that apparatus, system, component, whether or not it or that particular function is activated, turned on, or unlocked, as long as that apparatus, system, or component is so adapted, arranged, capable, configured, allowed, operable, or operative. Additionally, although this disclosure describes or illustrates particular embodiments as providing particular advantages, particular embodiments may provide none, some, or all of these advantages.

The invention claimed is:

1. An accessory port system comprising:

an accessory port comprising a contact positioned on an exterior vehicle surface configured to electrically couple with an accessory to transfer power to the accessory, wherein the accessory comprises a surface protrusion that extends transversely across an end of the accessory, wherein the surface protrusion is positioned between a first point on a wall that extends around the end of the accessory and a second point on the wall; and a processor configured to authenticate the accessory.

2. The accessory port system of claim 1, further comprising a cover that adjusts between a first configuration and a second configuration, wherein in the first configuration, the cover encloses the contact, and wherein in the second configuration, the cover exposes the contact.

3. The accessory port system of claim 1, further comprising a cover that adjusts between a first configuration and a second configuration when the accessory port physically couples with the accessory.

4. The accessory port system of claim 1, further comprising a cover that automatically adjusts from a first configuration to a second configuration upon detecting the accessory, and wherein the cover automatically adjusts from the second configuration to the first configuration upon detecting the accessory decoupling from the accessory port.

5. The accessory port system of claim 1, wherein the exterior vehicle surface is an inclined surface, and wherein the accessory port further comprises a drain positioned below the contact.

6. The accessory port system of claim 1, wherein the contact comprises an electrically-conductive material that is corrosion or wear resistant.

7. The accessory port system of claim 1, further comprising a connector on the exterior vehicle surface configured to physically couple with the accessory.

8. The accessory port system of claim 1, wherein the processor is further configured to control the power transferred to the accessory via the contact.

9. The accessory port system of claim 1, further comprising a seal positioned between the accessory and the accessory port while the accessory is physically coupled to the accessory port.

10. The accessory port system of claim 1, wherein the contact is flush with the exterior vehicle surface.

11. The accessory port system of claim 1, further comprising a mechanical indicator configured to provide an indication when the accessory is physically coupled to the accessory port.

12. An accessory system comprising:

a first accessory and a second accessory, wherein:

the first accessory comprises:

a connector configured to physically couple with an accessory port on an exterior vehicle surface;

a first contact configured to electrically couple with the accessory port and transfer power from the accessory port;

a surface protrusion that extends transversely across an end of the first accessory, wherein the surface protrusion is positioned between a first point on a wall that extends around the end of the first accessory and a second point on the wall; and a second contact; and the second contact is configured to transfer power and/or data with the second accessory.

13. The accessory system of claim 12, wherein the first contact is configured to debride a surface of a contact on the accessory port while the first accessory is physically coupling to the accessory port.

14. The accessory system of claim 12, wherein the connector is configured to debride a surface of a contact on the accessory port while the first accessory is coupling to the accessory port.

15. The accessory system of claim 12, wherein the first accessory further comprises a latch, wherein the first contact is adjusted in a direction away from the exterior vehicle surface when the latch is engaged while coupling the accessory port and the first accessory.

16. An accessory system comprising:

a first accessory and a second accessory, wherein:

the first accessory comprises:

a connector configured to physically couple with an accessory port on an exterior vehicle surface;

a first contact configured to electrically couple with the accessory port and transfer power from the accessory port;

a latch, wherein the first contact is adjusted in a direction away from the exterior vehicle surface when the latch is engaged while coupling the accessory port and the first accessory; and a second contact; and the second contact is configured to transfer power and/or data with the second accessory.

17. The accessory system of claim 16, wherein the first contact is configured to debride a surface of a contact on the accessory port while the first accessory is physically coupling to the accessory port.

18. The accessory system of claim 16, wherein the connector is configured to debride a surface of a contact on the accessory port while the first accessory is coupling to the accessory port.

19. The accessory system of claim 16, wherein the first accessory further comprises a surface protrusion that extends transversely across an end of the first accessory, wherein the surface protrusion is positioned between a first point on a wall that extends around the end of the first accessory and a second point on the wall.

20. The accessory system of claim 16, wherein the first contact comprises an electrically-conductive material that is corrosion or wear resistant.

* * * * *